(12) United States Patent
Sasahara

(10) Patent No.: US 9,511,771 B2
(45) Date of Patent: Dec. 6, 2016

(54) CONTROL DEVICE FOR AUTOMATIC TRANSMISSION

(71) Applicant: MAZDA MOTOR CORPORATION, Hiroshima (JP)

(72) Inventor: Manabu Sasahara, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/022,425

(22) PCT Filed: Jun. 2, 2015

(86) PCT No.: PCT/JP2015/065843
§ 371 (c)(1),
(2) Date: Mar. 16, 2016

(87) PCT Pub. No.: WO2016/009731
PCT Pub. Date: Jan. 21, 2016

(65) Prior Publication Data
US 2016/0221579 A1    Aug. 4, 2016

(30) Foreign Application Priority Data

Jul. 14, 2014   (JP) ................................. 2014-144083

(51) Int. Cl.
*B60W 10/04* (2006.01)
*B60W 30/18* (2012.01)
(Continued)

(52) U.S. Cl.
CPC ........ *B60W 30/18054* (2013.01); *B60W 10/06* (2013.01); *B60W 10/115* (2013.01);
(Continued)

(58) Field of Classification Search
CPC .......... B60W 30/18054; B60W 10/115; B60W 10/06;B60W 2510/108; B60W 2710/1005; B60W 2510/0642; F16H 61/686; F16H 61/04
See application file for complete search history.

(56) References Cited

U.S. PATENT DOCUMENTS

2005/0183916 A1   8/2005 Katou et al.
2010/0022342 A1*  1/2010 Samie ................... F16D 41/08
                                                  475/144
(Continued)

FOREIGN PATENT DOCUMENTS

JP    2005-233357 A    9/2005
JP    2005-257049 A    9/2005
(Continued)

OTHER PUBLICATIONS

International Search Report—PCT/JP2015/065843 mailed Aug. 25, 2015.

*Primary Examiner* — David J Hlavka
(74) *Attorney, Agent, or Firm* — Studebaker & Brackett PC

(57) ABSTRACT

The present application discloses a control device for an automatic transmission mounted in a vehicle including idling stop means for automatically stopping an engine when a predetermined stop condition is satisfied, and restarting the engine when a predetermined restart condition is satisfied in an engine automatically stopped state. The control device for the automatic transmission includes a first friction element and a second friction element fastened in a starting stage of the automatic transmission; and hydraulic-pressure controlling means for controlling hydraulic pressure for fastening the first and second friction elements. The first friction element includes a return spring that urges a piston of the first friction element to a release side. The second friction element includes a friction plate, a pressing piston that presses the friction plate, and a clearance adjustment piston (Continued)

that supports the pressing piston so as to allow relative movement of the pressing piston.

5 Claims, 16 Drawing Sheets

(51) Int. Cl.
    *F16H 61/04*     (2006.01)
    *F16H 61/686*     (2006.01)
    *B60W 10/06*     (2006.01)
    *B60W 10/115*     (2012.01)

(52) U.S. Cl.
    CPC ........... *F16H 61/04* (2013.01); *F16H 61/686* (2013.01); *B60W 2510/0642* (2013.01); *B60W 2510/108* (2013.01); *B60W 2710/1005* (2013.01)

(56) References Cited

U.S. PATENT DOCUMENTS

| | | | |
|---|---|---|---|
| 2010/0075794 A1* | 3/2010 | McConnell | F16H 61/0206 475/146 |
| 2010/0140038 A1* | 6/2010 | Goto | F16D 25/0638 192/48.611 |
| 2012/0065022 A1 | 3/2012 | Ohashi et al. | |
| 2012/0270702 A1 | 10/2012 | Ohashi et al. | |
| 2015/0051800 A1 | 2/2015 | Kamada et al. | |
| 2016/0016587 A1* | 1/2016 | Saji | F16H 61/0206 477/115 |

FOREIGN PATENT DOCUMENTS

| | | |
|---|---|---|
| JP | 2010-216625 A | 9/2010 |
| JP | 2013-224716 A | 10/2013 |

* cited by examiner

FIG.2

|  | LOW CLUTCH (40) | HIGH CLUTCH (50) | LR BRAKE (60) | 26 BRAKE (70) | R35 BRAKE (80) |
|---|---|---|---|---|---|
| FIRST SPEED | ○ |  | ○ |  |  |
| SECOND SPEED | ○ |  |  | ○ |  |
| THIRD SPEED | ○ |  |  |  | ○ |
| FOURTH SPEED | ○ | ○ |  |  |  |
| FIFTH SPEED |  | ○ |  |  | ○ |
| SIXTH SPEED |  | ○ |  | ○ |  |
| REVERSE SPEED |  |  | ○ |  | ○ |

CONTROL DEVICE FOR AUTOMATIC TRANSMISSION

TECHNICAL FIELD

The present invention relates to a control device for an automatic transmission, more particularly, to a control device for an automatic transmission mounted in a vehicle in which idling-stop control is performed and, still more particularly, to a control device for an automatic transmission including a friction element which has a clearance adjustment piston and a pressing piston.

BACKGROUND ART

With regard to an automatic transmission mounted in a vehicle such as an automobile, a starting stage such as forward first-speed has been conducted by fastening of one friction element and engagement of one one-way clutch. However, the one-way clutch is heavy and causes drag resistance in transmission stages other than the starting stage. Therefore, as disclosed in Patent Document 1, it is known that the starting stage is implemented by fastening of two friction elements without the one-way clutch. Patent Document 1 discloses that a double acting type friction element including a clearance adjustment piston (referred to as "13 piston") and a pressing piston (referred to as "A piston") is used as one of the two friction elements fastened in the starting stage to improve controllability.

With regard to the double acting type friction element, the B piston is provided and moves in a transmission case. The A piston is provided in the B piston to cause relatively movement. When hydraulic pressure is supplied to a hydraulic chamber (referred to as "B chamber") of the B piston to move the B piston, the A piston comes into contact with a friction plate so that the clearance of the friction plate decreases to zero (the hydraulic pressure of the B chamber at this time is referred to as "first hydraulic pressure"). When hydraulic pressure is supplied to a hydraulic chamber of the A piston (referred to as "A chamber") in this state, the A piston presses the friction plate so that the double acting type friction element is set to a fastened state (the hydraulic pressure of the A chamber at this time is referred to as "second hydraulic pressure"). When the hydraulic pressure of the A chamber (i.e. the second hydraulic pressure) dissipates in this state, the A piston stops pressing the friction plate so that the double acting type friction element is set to a released state. In this way, the double acting type friction element is responsively fastened by the A piston on standby in a position where the clearance of the friction plate is zero ("referred to as "zero clearance position"). There is a decrease in a fastening shock.

With regard to a vehicle (referred to as "idling stop vehicle") which conducts idling stop control to automatically stop an engine when predetermined stop conditions are satisfied and restart the engine when predetermined restart conditions are satisfied in an engine automatic stop state, there are the following problems when the double acting type friction element is fastened in the starting stage.

It is desirable for an electric oil pump to supply hydraulic pressure in advance to hydraulic chambers of friction elements fastened in the starting stage while the engine is stopped automatically by the idling stop control so that the vehicle may quickly start during the engine restart. For example, two friction elements fastened in the starting stage (forward first-speed stage) of a D range are a friction element (referred to as "first friction element") including a single piston and a single hydraulic chamber, and the double acting type friction element (referred to as "second friction element") described above. While the engine is stopped automatically in the D range, there is a supply of hydraulic pressure to the first friction element for changing the first friction element to a fastened state and a supply of the first hydraulic pressure to the B chamber of the second friction element whereas the hydraulic pressure of the A chamber dissipates. Consequently, the first friction element is set to the fastened state whereas the A piston of the second friction element is set to a standby state in the zero clearance position. The second friction element is responsively fastened to make the starting stage responsive simply by a supply of the second hydraulic pressure to the A chamber. Therefore, the vehicle may be quickly started during the engine restart.

A range may be switched from the D range to the P range while the engine is stopped automatically after the vehicle stops in the D range and the engine automatically stops. It is desirable to surely block a power transmission route and avoid generation of a driving force while the engine is stopped automatically in the P range, for a failsafe purpose. Therefore, the hydraulic pressure of the first friction element dissipates in a hydraulic pressure control state in the D range when the range is switched to the P range during the automatic engine stop in the D range. In short, both of the two friction elements fastened in the starting stage of the D range are changed to the released state.

The engine may be restarted by a subsequent P→D selecting operation during an automatic stop of the engine in the P range. The first friction element is fastened, and then the second friction element excellent in controllability is fastened when the starting stage of the D range is conducted during the engine restart. There may be high controllability of fastening control with a suppressed shock. The first friction element fastened earlier includes a return spring that urges a piston to a release side. The piston has to move to the fastening side under compression of the return spring against an urging force of the return spring in order to fasten the first friction element. This requires sufficiently high hydraulic pressure. However, hydraulic pressure generated by a mechanical oil pump is still relatively tow immediately after the engine restart, the mechanical oil pump being driven by the engine. Therefore, it takes time to move the piston against the urging force of the return spring. In other words, it takes time to fasten the first friction element. Consequently, even if the A piston of the second friction element is put on standby in the zero clearance position, the fastening of the second friction element is delayed so that the starting stage implementation becomes less responsive.

The same problem may happen, for example, when P→R selecting operation is performed during an automatic stop of the engine in the P range, when N→D selecting operation or N→R selecting operation is performed during an automatic stop of the engine in the N range, and when D→R selecting operation is performed during an automatic stop of the engine in the D range.

PATENT LITERATURE

Patent Document 1: JP 2013-224716 A

SUMMARY OF INVENTION

The present invention addresses the problems in the automatic transmission mounted in the idling stop vehicle. An object of the present invention is to provide a control device for an automatic transmission which fastens friction elements in a short time to implement a responsive starting stage at engine restart caused by range selecting operation during an automatic stop of the engine.

The present invention provides a control device for an automatic transmission for solving the problems, the automatic transmission being mounted in a vehicle including idling stop means for automatically stopping an engine when a predetermined stop condition is satisfied and restarting the engine when a predetermined restart condition is satisfied during the automatic engine stop. The control device for the automatic transmission includes a first friction element and a second friction element fastened in a starting stage of the automatic transmission; and hydraulic-pressure controlling means for controlling hydraulic pressure for fastening the first and second friction elements. The first friction element includes a return spring that urges a piston of the first friction element to a release side. The second friction element includes a friction plate, a pressing piston that presses the friction plate and a clearance adjustment piston that supports the pressing piston so as to allow relative movement of the pressing piston. The pressing piston comes into contact with the friction plate so that a clearance of the friction plate decreases to zero when first hydraulic pressure is supplied to the clearance adjustment piston so that the clearance adjustment piston is moved. When second hydraulic pressure is supplied to the pressing piston in this state, the pressing piston presses the friction plate to cause a fastened state of the second friction element. The hydraulic-pressure controlling means supplies fastening hydraulic pressure to the first friction element to change the first friction element to the fastened state after supplying the second hydraulic pressure to the pressing piston if the engine is restarted by selecting operation. An automatic stop happens to the engine if there is no supply of the fastening hydraulic pressure to the first friction element and no supply of the second hydraulic pressure to the pressing piston whereas the first hydraulic pressure is supplied to the clearance adjustment piston. The selecting operation switches the automatic stop to a range in which all of the fastening hydraulic pressure, the first hydraulic pressure and the second hydraulic pressure are supplied.

The aforementioned and other objects, features and advantages of the present invention are made clear from the following detailed description and the accompanying drawings.

BRIEF DESCRIPTION OF DRAWINGS

FIG. 2 is a table showing fastening for the automatic transmission.

DESCRIPTION OF EMBODIMENTS (1) Configuration

Figure 1:
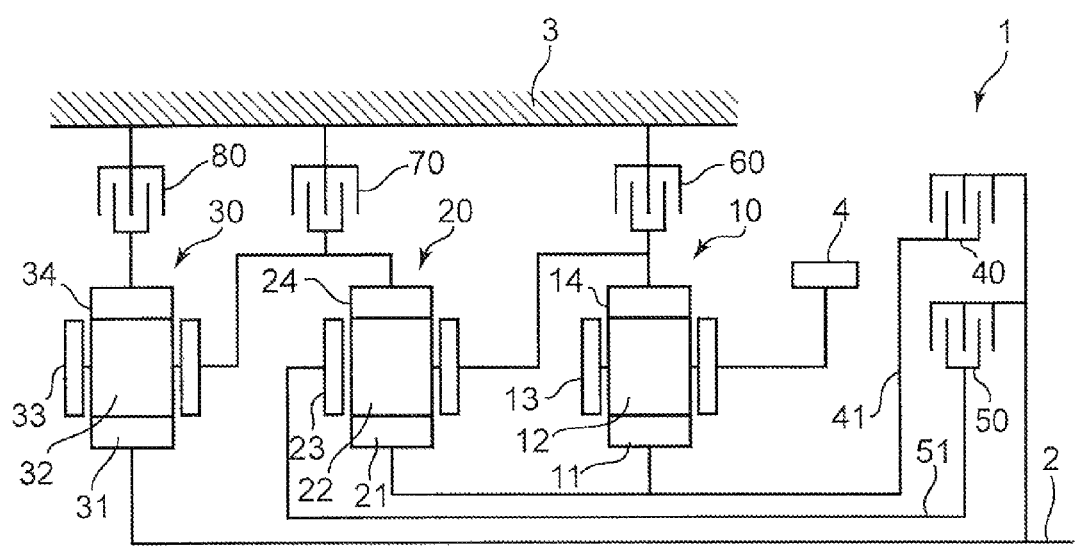
FIG. 1 is a schematic diagram of an automatic transmission according to one embodiment of the present invention.

FIG. 1 is a schematic diagram of an automatic transmission 1 according to this embodiment. The automatic transmission 1 is mounted in a vehicle, more specifically, an idling stop vehicle which conducts idling stop control to automatically stop an engine (not shown in the figure) when predetermined stop conditions are satisfied and restart the engine when predetermined restart conditions are satisfied in an engine automatically stopped state.

As one of the stop conditions, a brake pedal has to be stepped on at zero speed of the vehicle, basically. As additional conditions, residual capacity of a battery has to be no less than a predetermined amount or a difference between a set temperature of an air conditioner and an interior temperature of the vehicle has to be no larger than a predetermined value. The restart conditions may be that the step on the brake pedal is removed in a D range (a forward traveling range) or that selecting operation is conducted. With regard to the restart conditions in non-traveling ranges such as an N range (a neutral range) and a P range (a parking range), N→D selecting operation or P→D selecting operation has to be conducted. Or, N→R selecting operation or P→R selecting operation has to be conducted.

The automatic transmission 1 includes an input shaft 2, to which output torque of the engine is input via a torque converter (not shown). There are first, second, and third planetary gear sets 10, 20, 30 (hereinafter, "planetary gear set" is simply referred to as "gear set") on the input shaft 2 so that they are arranged sequentially from a side of the engine (from the right side of the figure). A low clutch 40 (in correspondence to the "first friction element" of the present invention), a high clutch 50, a low reverse brake 60 (LR brake) (in correspondence to the "second friction element" of the present invention), a second speed/sixth speed brake 70 (26 brake), and a reverse speed/third speed/fifth speed brake 80 (R35 brake) (in correspondence to the "first friction element" of the present invention) are provided as friction elements for switching a power transmission route formed by the gear sets 10, 20, 30. The friction elements 40, 50, 60, 70, 80 are the hydraulic type. The low and high clutches 40, 50 selectively transmit power, which is input from the input shaft 2 to the gear sets 10, 20, 30. The LR brake 60, the 26 brake 70 and the R35 brake 80 fix predetermined rotation elements of the gear sets 10, 20, 30 to a transmission case 3.

All of the gear sets 10, 20, 30 are formed from sun gears 11, 21, 31, pinions 12, 22, 32, which mesh with the sun gears 11, 21, 31, carriers 13, 23, 33, which support the pinions 12, 22, 32, and ring gears 14, 24, 34, which mesh with the pinions 12, 22, 32.

The sun gear 11, 21 of the first and second gear sets 10, 20 are joined to each other and coupled to an output member 41 of the low clutch 40. The carrier 23 of the second gear set 20 is coupled to an output member 51 of the high clutch 50. The sun gear 31 of the third gear set 30 is coupled to the input shaft 2. An output gear 4 is coupled to the carrier 13 of the first gear set 10. Output torque of the automatic transmission 1 is output from the output gear 4 to a side of a drive wheel (not shown in the figure).

The ring gear 14 of the first gear set 10 and the carrier 23 of the second gear set 20 are jointed to each other. The LR brake 60 is interposed between the ring gear 14/the carrier 23 and the transmission case 3. The ring gear 24 of the second gear set 20 and the carrier 33 of the third gear set 30 are joined to each other. The 26 brake 70 is interposed between the ring gear 24/the carrier 33 and the transmission case 3. The R35 brake 80 is interposed between the ring gear 34 of the third gear set 30 and the transmission case 3.

With regard to the aforementioned configuration, the automatic transmission 1 uses a combination of fastened states of the five friction elements 40, 50, 60, 70, 80 as shown in FIG. 2 to conduct forward first to sixth speeds in the D range and reverse speed in the R range (a reverse traveling range). With regard to this embodiment, the low clutch 40 and the R brake 60 are fastened in the forward first speed (a forward starting stage), as clearly shown in FIG. 2. The LR brake 60 and the R35 brake 80 are fastened in the reverse speed (a reverse starting stage). In short, the low clutch 40 is fastened in a starting stage of the 1) range and released in a starting stage of the R range. The R35 brake 80 is released in the starting stage of the D range and fastened in the starting stage of the R range. The LR brake 60 is fastened in both of the starting stage of the D range and the starting stage of the R range.

Figure 3:
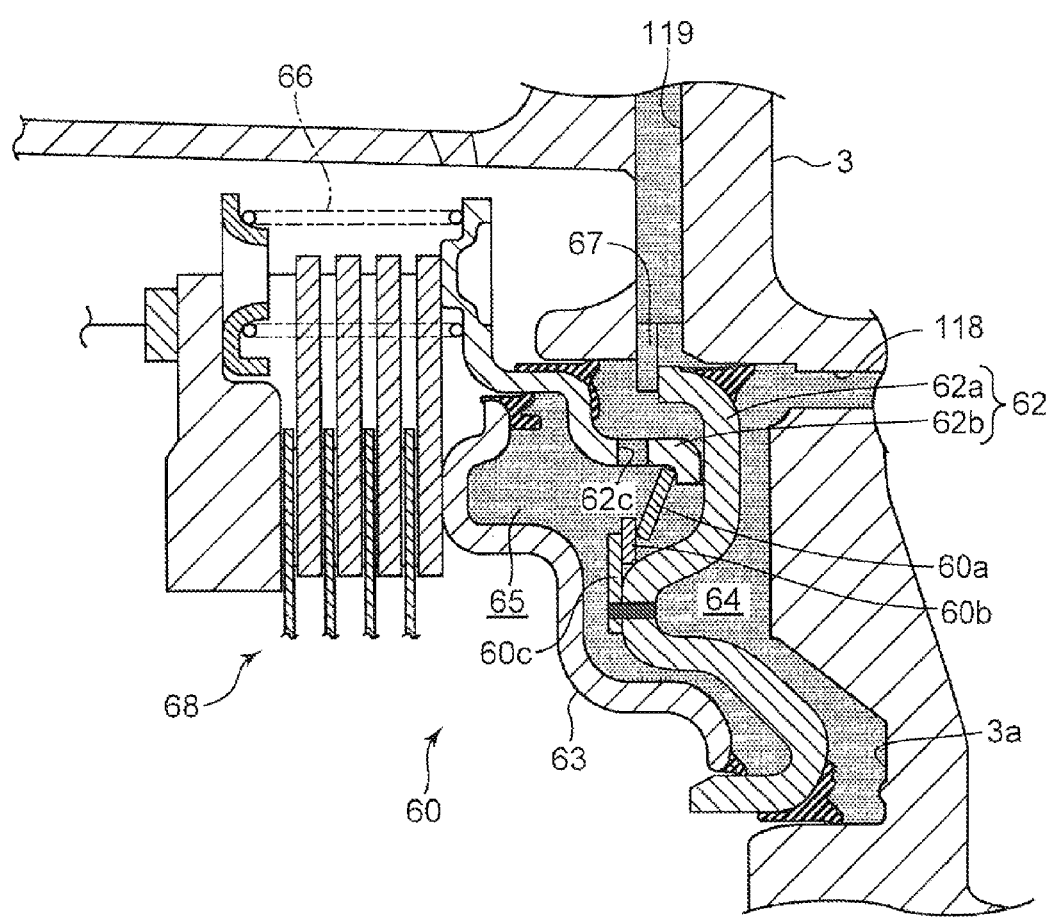
FIG. 3 is a sectional view of a low reverse brake (LR brake) provided in the automatic transmission, in which hydraulic pressure is supplied to both of an A chamber and a B chamber.
Figure 4:
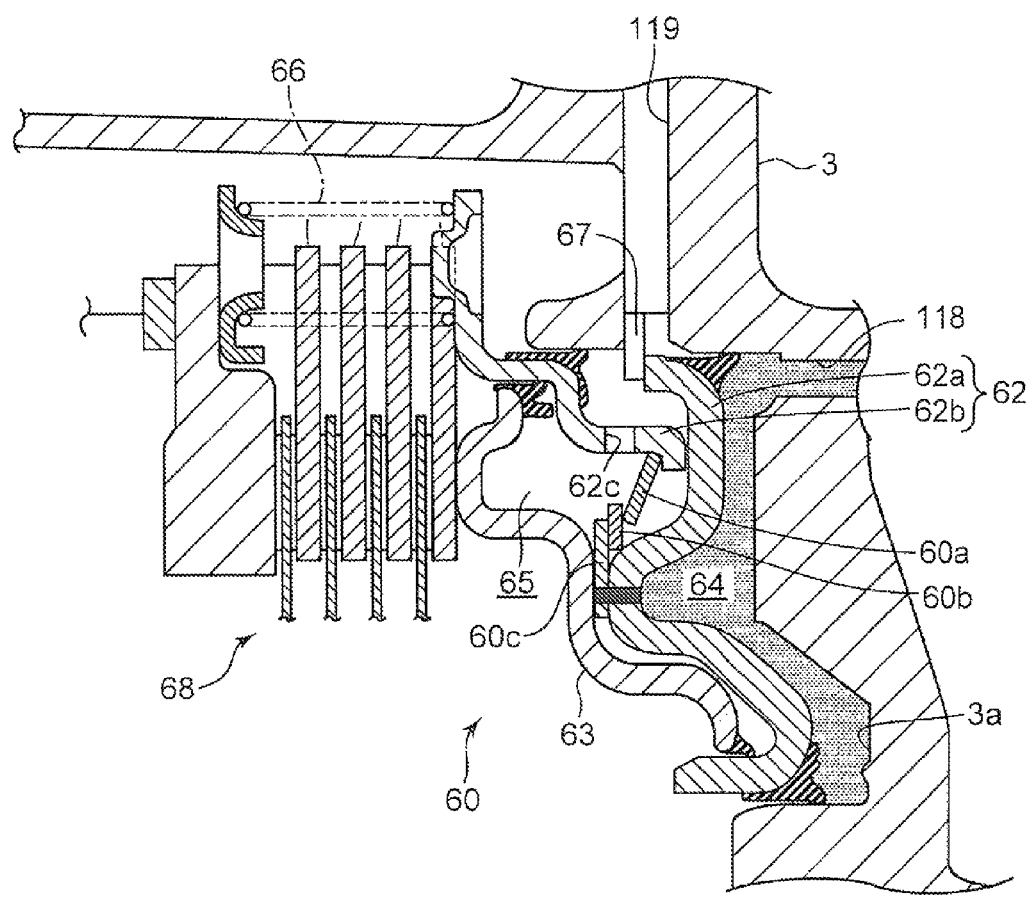
FIG. 4 is a sectional view showing a supply of the hydraulic pressure only to the B chamber.
Figure 5:
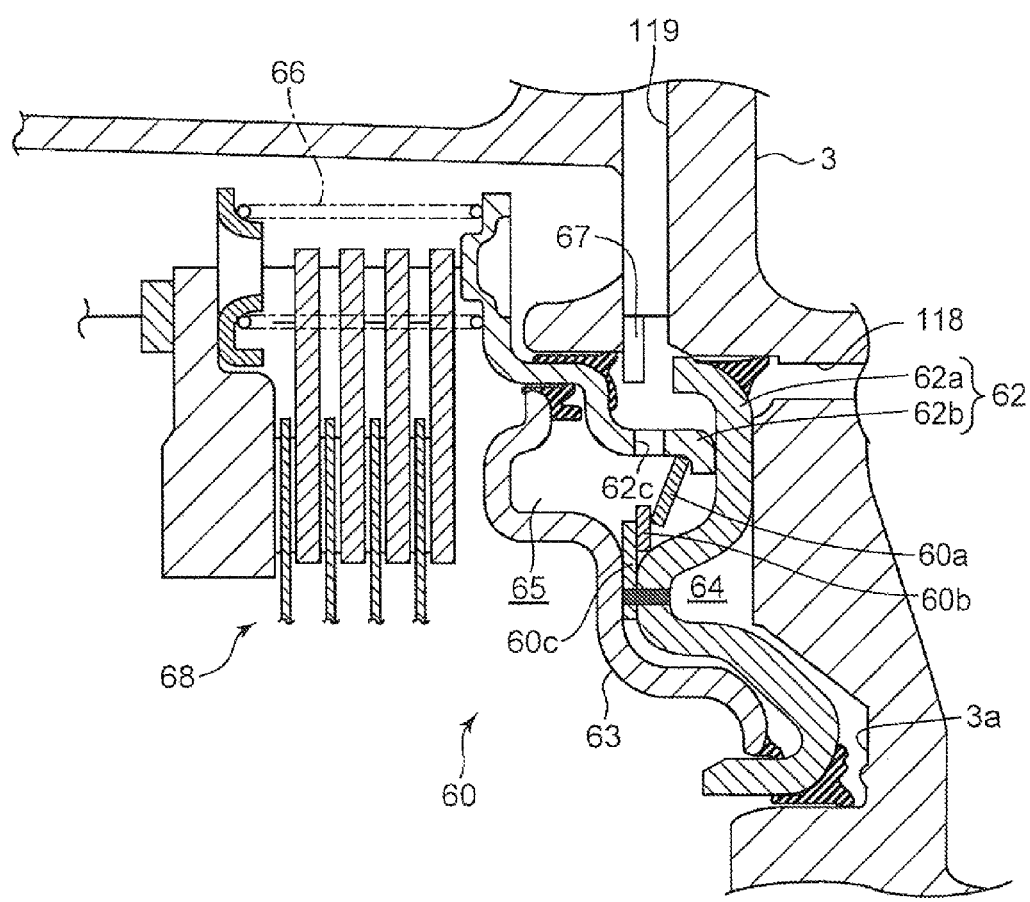
FIG. 5 is a sectional view showing dissipation of the hydraulic pressure from both of the A chamber and the B chamber.

As shown in FIGS. 3 to 5, a double acting type friction element including a clearance adjusting function may be used as the LR brake 60 to enhance controllability. The LR brake 60 includes a clearance adjustment piston a B piston 62) and a pressing piston (i.e. an A piston 63). The B piston 62 may be divided into a first piston member 62a and a second piston member 62b for easy assembly. After the assembly, the first and second piston members 62a, 62b are graded by a disc spring 60a, a snap ring 60b and an annular fixed plate 60c.

The B piston 62 is fit in a cylinder 3a formed in the transmission case 3 to move in the ax direction. A hydraulic-chamber of the B piston 62 (i.e. a B chamber 64 (a hydraulic chamber of the clearance adjustment piston)) is formed between the B piston 62 and the transmission case 3. Hydraulic pressure (referred to as "B chamber pressure") is supplied to the B chamber 64 via a B chamber line 118 (cf. FIG. 6) formed in the transmission case 3.

Figure 6:
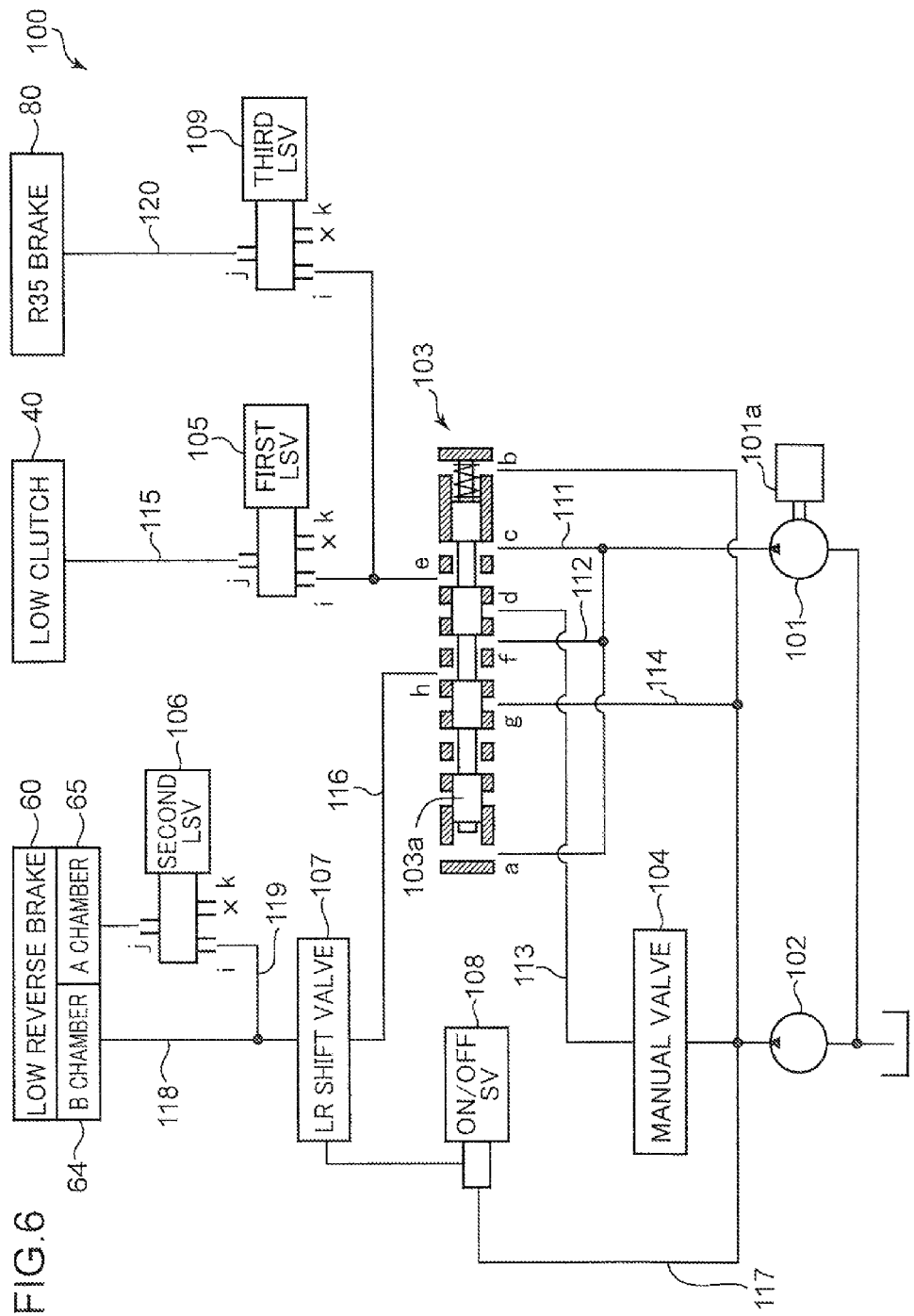
FIG. 6 is a diagram showing a main part of a hydraulic circuit provided in the automatic transmission.

The A piston 63 is fit on the inner side of the B piston 62 so as to relatively move in the axial direction. A hydraulic chamber of the A piston 63 (i.e. an A chamber 65 (a hydraulic chamber of the pressing piston)) is formed between the A piston 63 and the B piston 62. Hydraulic pressure (referred to as "A chamber pressure") is supplied to the A chamber 65 via an A chamber line 119 (c.f. FIG. 6) formed in the transmission, case 3 and a communication hole 62c formed in the second piston member 62b.

When predetermined first hydraulic pressure (e.g. several hundred kPa) is supplied to the B chamber 64, predetermined second hydraulic pressure (e.g. several hundred kPa) is supplied to the A chamber 65, as shown in FIG. 3 (a dot-painted portion in the figure indicates that hydraulic pressure is supplied; the same being applicable to FIG. 4). The B piston 62 is moved leftward in the figure by the first hydraulic pressure against an urging force of a return spring 66 until the B piston 62 comes into contact with a stopper 67. The A piston 63 also moves leftward in the figure. The A piston 63 receives a pressing force from the second hydraulic pressure to press friction plates 68, which are alternately engaged with the transmission case 3 and a member to be braked (i.e. a member to which the ring gear 14 of the first gear set 10 and the carrier 23 of the second gear set 20 are joined). Consequently, the LR brake 60 is set to the fastened state.

When the hydraulic pressure of the A chamber 65 (i.e. the A chamber pressure) dissipates in this state as shown in FIG. 4, the pressing force of the A piston 63 also dissipates while the A piston 63 remains in contact with the friction plate 68. Consequently, the LR brake 60 is set to a released state. At this moment, a clearance of the friction plate 68 is zero. The A piston 63 stays on standby in a zero clearance position.

When the hydraulic pressure of the B chamber 64 (i.e. the B chamber pressure) then dissipates in this state as shown in FIG. 5, the B piston 62 is moved rightward in the figure by the urging force of the return spring 66. At this moment. The A piston 63 is moved rightward in the figure together with the B piston 62 by a frictional force of a seal member attached to the A piston 63 so that the A piston 63 keeps a positional relationship with the B piston 62.

When the LR brake 60 is then fastened, hydraulic pressure is supplied to the B chamber 64. Consequently, the A piston 63 and the B piston 62 move leftward in the figure while the A piston 63 and the B piston 62 keep the positional relationship (c.f. FIG. 4). At this moment, the A piston 63 comes into contact with the friction plate 68 so that the clearance of the friction plate 68 decreases to zero. In short, the A piston 63 is set to a standby state at the zero clearance position. When hydraulic pressure is supplied to the A chamber 65 in this state, the A piston 63 presses the friction plates 68 substantially simultaneously with the supply of the hydraulic pressure so that the LR brake 60 is responsively fastened (c.f. FIG. 3).

In short, when the LR brake 60 is fastened, hydraulic pressure is supplied in the order of the B chamber 64 and the A chamber 65. When the LR brake 60 is released, hydraulic pressure dissipates in the order of A chamber 65 and the B chamber 64.

As clearly shown in FIGS. 3 to 5, the LR brake 60 includes the return spring 66 that urges the B piston 62 to a release side. However, the LR brake 60 does not include a return spring that urges the A piston 63 to the release side.

Figure 15:
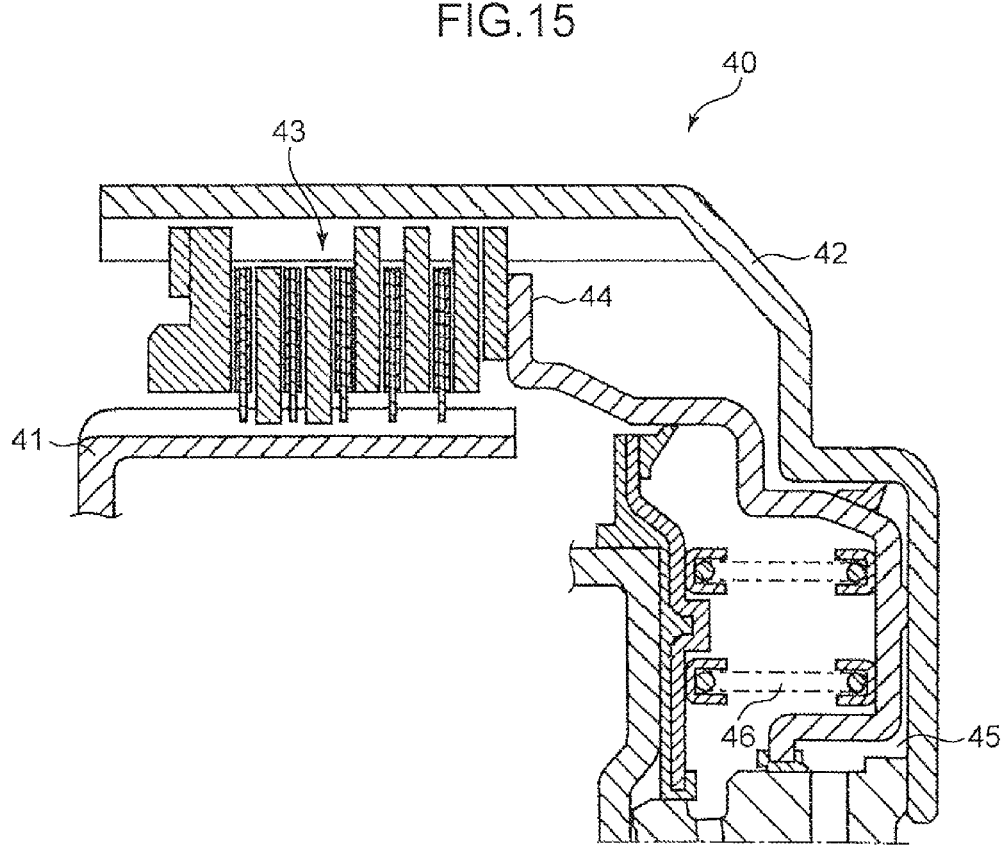
FIG. 15 is a sectional view of a low clutch provided in the automatic transmission.
Figure 16:
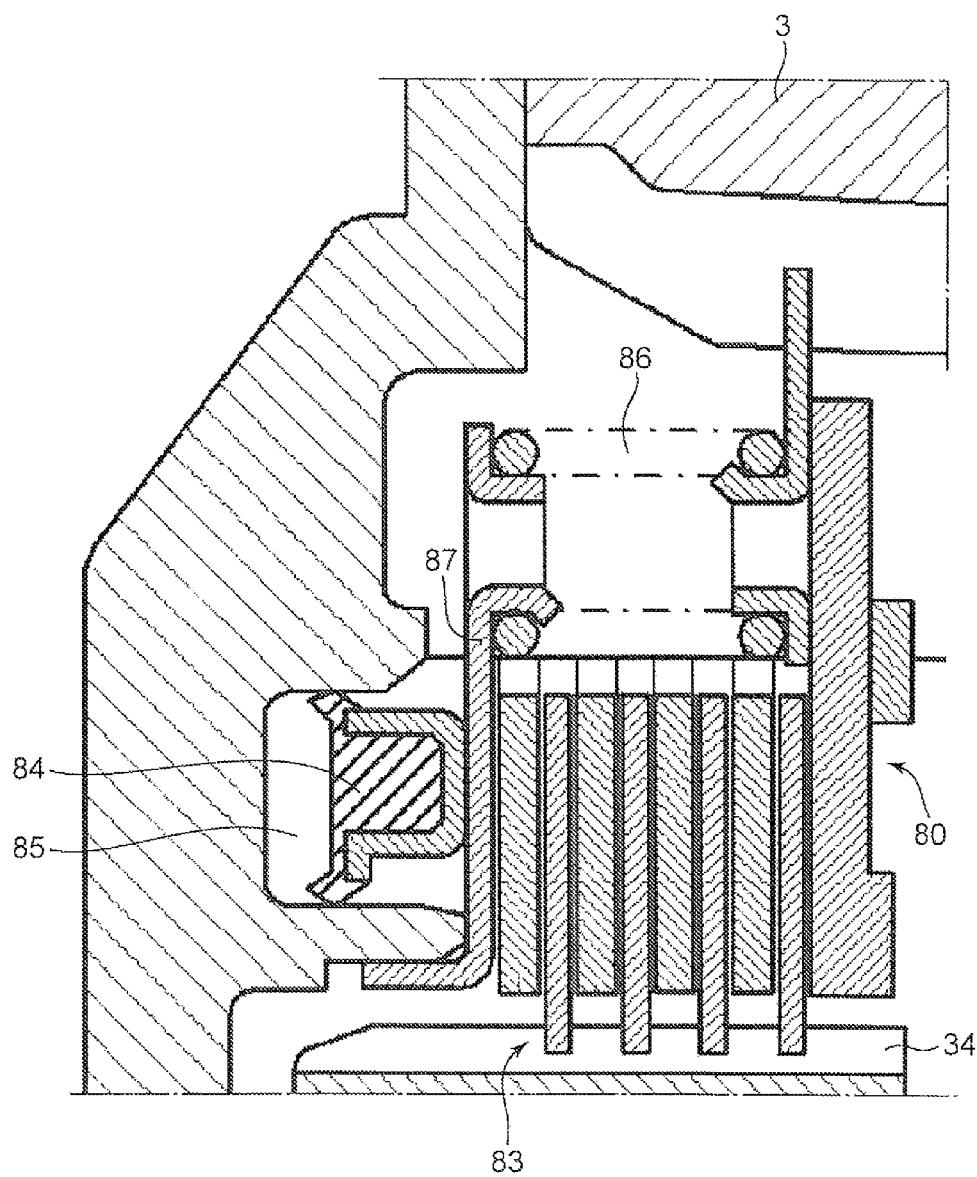
FIG. 16 is a sectional view of a reverse speed/third speed/fifth speed brake (R35 brake) provided in the automatic transmission.

On the other hand, both of the low clutch 40 fastened together with the LR brake 60 in the forward first speed and the R35 brake 80 fastened together with the LR brake 60 in the reverse speed include, as shown in FIGS. 15 and 16, single pistons 44, 84, single hydraulic chambers 45, 85 and return springs 46, 86 that urge the pistons 44, 84 to the release side (the right side of FIG. 15 and the left side of FIG. 16).

As shown in FIG. 15, the low clutch 40 includes the output member 41, which forms a clutch hub, a clutch drum 42, which is fastened to the input shaft 2, friction plates 43, which are engaged with the output member 41 and the clutch drum 42, the piston 44, which presses the friction plates 43, the hydraulic chamber 45, to which hydraulic pressure is supplied to move the piston 44 to a pressing side (a fastening side), and the return spring 46, which urges the piston 44 to the release side (the right side of FIG. 15).

As shown in FIG. 16, the R35 brake 80 includes the ring gear 34 of the third gear set 30, friction plates 83, which are engaged with the transmission case 3, the piston 84, which presses the friction plates 83, the hydraulic chamber 85, to which hydraulic pressure is supplied to move the piston 84 to the pressing side (the fastening side), and the return spring 86, which urges the piston 84 to the release side (the left side of FIG. 16) via a plate member 87.

FIG. 6 is a diagram showing a main part of a hydraulic circuit 100 provided in the automatic transmission 1. The automatic transmission 1 includes the hydraulic circuit 100 which selectively supplies hydraulic pressure to the friction elements 40, 50, 60, 70, 80 to conduct the transmission stages shown in FIG. 2. As described above, the vehicle according to this embodiment is the idling stop vehicle. Therefore, the vehicle includes not only a mechanical oil pump 102 driven by the engine to generate hydraulic pressure but also an electric oil pump 101, which is driven by a motor 101a to generate hydraulic pressure while the engine is stopped automatically under the idling stop control.

Hydraulic pressure may be introduced into the hydraulic circuit 100 from both of the mechanical oil pump 102 and the electric oil pump 101. The hydraulic circuit 100 includes a pump switching valve 103, a manual valve 104, a first linear solenoid valve 105 (written as "first LSV" in FIG. 6), a second linear solenoid valve 106 (written as "second LSV" in FIG. 6), a low reverse shift valve 107 (written as "LR shift valve" in FIG. 6), an ON/OFF solenoid valve 108 (written as "ON/OFF SV" in FIG. 6) and a third linear solenoid valve 109 (written as "third LSV" in FIG. 6) as valves for supplying the introduced hydraulic pressure to the low clutch 40 fastened in the forward first speed (more specifically, the hydraulic chamber 45 thereof), the R35 brake 80 fastened in the reverse speed (more specifically, the hydraulic chamber 85 thereof), and the LR brake 60 fastened in the forward first speed and the reverse speed (more specifically, the B chamber 64 and the A chamber 65).

The pump switching valve 103 switches supply of hydraulic pressure of one of the two pumps 101, 102 to the two friction elements 40, 60. The manual valve 104 operates in response to range selecting operation of a driver. The first LSV 105 controls hydraulic pressure (referred to as "low clutch pressure") supplied to the hydraulic chamber 45 of the low clutch 40. The second LSV 106 controls hydraulic pressure supplied to the A chamber 65 of the LR brake 60 (i.e. A chamber pressure). The LR shift valve 107 and the ON/OFF SV 108 controls the order of supply and dissipation of hydraulic pressure to and from the B chamber 64 and the A chamber 65 of the LR brake 60. As described above, the hydraulic pressure is supplied in the order of the B chamber 64 and the A chamber 65 when the LR brake 60 is fastened. The hydraulic pressure dissipates in the order of the A chamber 65 and the B chamber 64 when the LR brake 60 is released. The third LSV 109 controls hydraulic pressure (referred to as "R35 brake pressure") supplied to the hydraulic chamber 85 of the R35 brake 80.

The pump switching valve 103 includes ports "a" and "b" for switching a position of a spool 103a, the ports "a" and "b" being situated at both ends in the axial direction. Hydraulic pressure of the electric oil pump 101 is introduced into the port "a" on the left side of the figure by the driven electric oil pump 101 as shown in the figure to shift the spool 103a rightward. Hydraulic pressure of the mechanical oil pump 102 is introduced into the port "b" on the right side of the figure by the driven mechanical oil pump 102 to shift the spool 103a leftward.

The pump switching valve 103 further includes input ports "c" and "d" and an output port "e" for the low clutch 40 and input ports "f" and "g" and an output port "h" for the LR brake 60. When the spool 103a shifts rightward as shown in the figure, the port "c" and the port "c" for the low clutch 40 communicate with each other, and the port "f" and the port "h" for the LR brake 60 communicate with each other. When the spool 103a shifts leftward, the port "d" and the port "e" for the low clutch 40 communicate with each other, and the port "g" and the port "h" for the LR brake 60 communicate with each other.

Oil paths 111, 112 led from the electric oil pump 101 are respectively connected to the input port "c" for the low clutch 40 and the input port "f" for the LR brake 60. Oil paths 313, 114 led from the mechanical oil pump 102 are respectively connected to the input port "d" for the low clutch 40 and the input port "g" for the LR brake 60. The oil path 113 is led from the mechanical oil pump 102 via the manual valve 104. The manual valve 104 communicates the mechanical oil pump 102 with the oil path 113 when the D range or the R range is selected. The manual valve 104 put the oil path 113 in a drain condition when the N range or the P range is selected.

A low clutch line 115 led from the hydraulic chamber 45 of the low clutch 40 is connected to the output port "e" for the low clutch 40 via the first LSV 105. An R35 brake line 120 led from the hydraulic chamber 85 of the R35 brake 80 is connected via the third LSV 109 to a side of the pump switching valve 103 rather than the first LSV 105 of the low clutch line 115. An LR brake line 116 led from the LR shift valve 107 is connected to the output port "h" for the LR brake 60. B chamber line 118 led from the B chamber 64 of the LR brake 60 is connected to the LR shift valve 107. An A chamber line 119 led from the A chamber 65 of the LR brake 60 is connected to the B chamber line 118 via the second LSV 106.

All of the first, second and third LSVs 105, 106, 109 include input ports i, output ports j and drain ports k. The first, second and third LSVs 105, 106, 109 communicate the input ports i with the output ports j in an open condition. The first, second and third LSVs 105, 106, 109 communicate the output ports j with the drain ports k in a close condition.

An oil path 117 led from the mechanical oil pump 102 is connected via the ON/OFF SV 108 to one end in the axial direction of the LR shift valve 107. The ON/OFF SV 108 introduces hydraulic pressure of the mechanical oil pump 102 into the one end of the LR shift valve 107 in an open condition to shift a spool (not shown in the figure) of the LR shift valve 107 rightward so that the B chamber line 118 and the A chamber line 119 become a drain condition. On the other hand, the ON/OFF SV 108 shifts the spool leftward in a close condition to communicate LR brake line 116 with the B chamber line 118 and the A chamber line 119.

As described above, the LR brake 60 is fastened only in the forward first speed and the reverse speed which are used less frequently and times. Therefore, the ON/OFF SV 108 causes a longer time of an open state in which the B chamber line 118 and the A chamber line 119 are kept in a drain condition than a time of a close state in which the LR brake line 116 is communicated with the B chamber line 118 and the A chamber line 119. With regard to this embodiment, the ON/OFF SV 108 of a normal open type is adopted, the ON/OFF SV 108 being set to the open state during non-energization (during OFF). Accordingly, power consumption of the ON/OFF SV 108 may be small. Consequently, fuel performance is improved.

Figure 7:
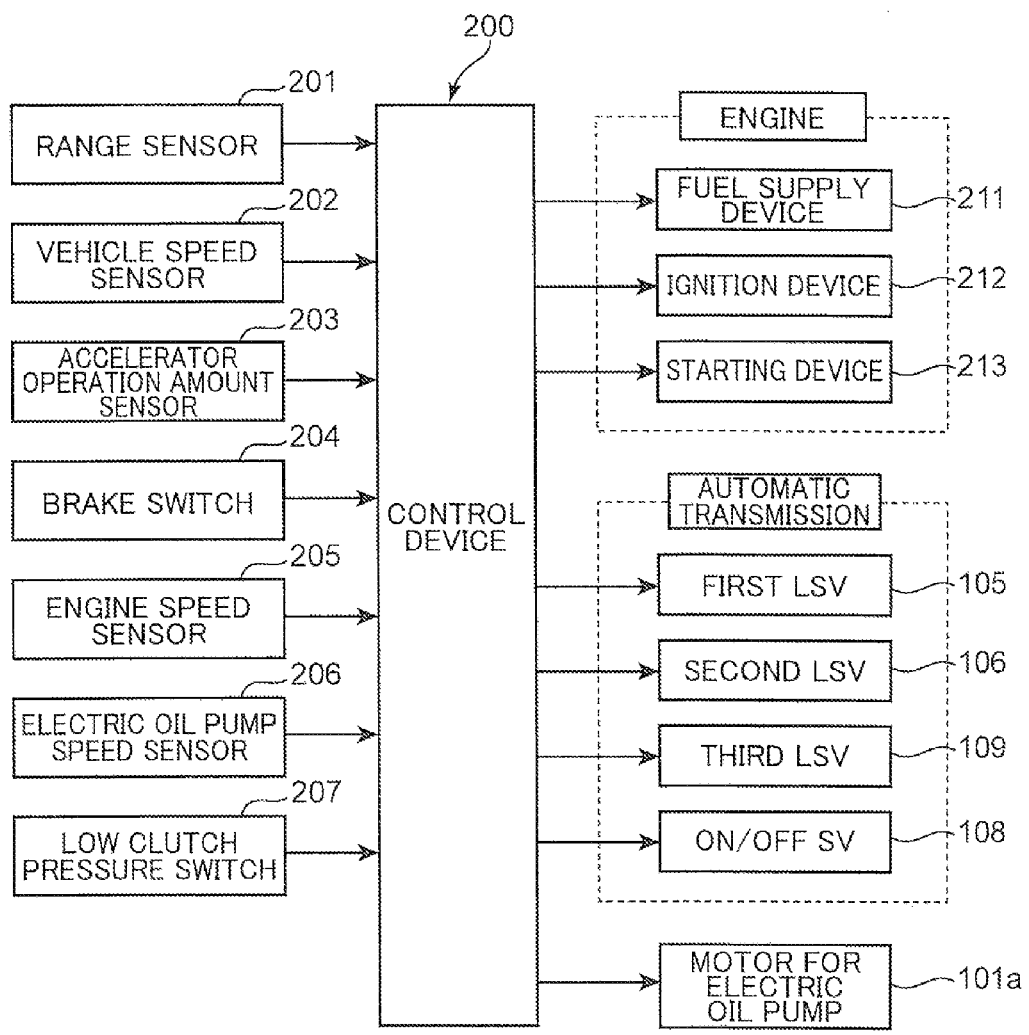
FIG. 7 is a control system diagram of a vehicle including the automatic transmission.

FIG. 7 is a control system diagram of the idling stop vehicle including the automatic transmission 1. A control device 200 is a microprocessor formed from a CPU, a ROM, a RAM and alike. The control device 200 corresponds to the "idling stop means" and the "hydraulic-pressure controlling means" of the present invention.

The control device 200 receives a signal from a range sensor 201, which detects a range of the automatic transmission 1 selected by the driver, a signal from a vehicle speed sensor 202, which detects vehicle speed of the vehicle, a signal from an accelerator operation amount sensor 203, which detects an operation amount of an accelerator pedal by the driver, a signal from a brake switch 204, which detects step-on of a brake pedal by the driver, a signal from an engine speed sensor 205, which detects the number of revolutions of the engine, a signal from an electric oil pump speed sensor 206, which detects the number of revolutions of the electric oil pump 101, and a signal from a low clutch pressure switch 207 (in correspondence to the "hydraulic-pressure detecting means" of the present invention), which is turned on when hydraulic pressure supplied to the hydraulic chamber 45 of the low clutch 40 (i.e. low clutch pressure is higher than predetermined reference hydraulic pressure) and turned of when the low clutch pressure is no larger than the reference hydraulic pressure.

The control device 200 outputs control signals on the basis of these signals to a fuel supply device 211, an ignition device 212 and a starting device 213 in order to perform the idling stop control. The control device 200 outputs a control signal to the motor 101*a* for the electric oil pump. The control device 200 also outputs control signals to the first LSV 105, the second LSV 106, the third LSV 109 and the ON/OFF SV 108 of the hydraulic circuit 100 of the automatic transmission 1 in order to perform hydraulic pressure control of the low clutch 40, the LR brake 60 and the R35 brake 80 of the automatic transmission 1 during the idling stop control.

[P→D Selecting Restart]

Figure 8:
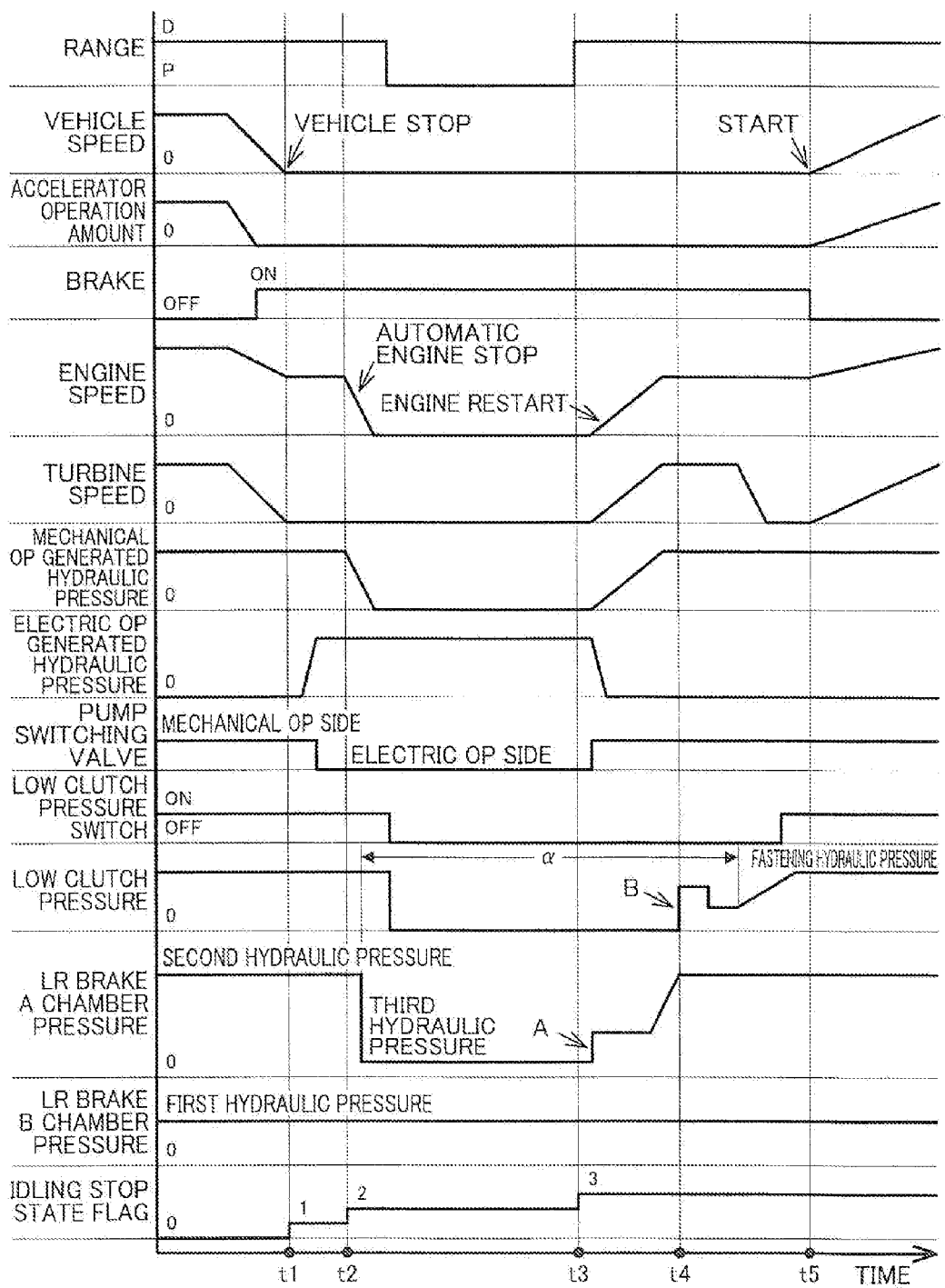
FIG. 8 is a time chart showing an exemplificative control operation when a range of the automatic transmission is switched to perform D→P→D shift.

FIG. 8 is a time chart showing an exemplificative control operation performed by the control device 200. The time chart indicates changes in various signals and state amounts from a time before a stop to a time after a start of the vehicle. The control device 200 performs the idling stop control and hydraulic pressure control of the low clutch 40 and the LR brake 60 during the stop of the vehicle. With regard to the example shown in FIG. 8, the range of the automatic transmission 1 is switched from the D range to the P range during idling stop control, and then the P→D selecting operation is performed to restart the engine (P→D selecting restart).

In FIG. 8, an idling stop state flag changes from 0 to 1 at the time U. The flag changes from 1 to 2 at the time t2. The flag changes from 2 to 3 at the time t3. The A chamber pressure reaches the second hydraulic pressure at the time 4 to start increasing the low clutch pressure. The vehicle starts at the time 5.

The vehicle travels forward in the D range until the time t1. The forward first stage is implemented as a transmission stage of the automatic transmission 1. In short, hydraulic pressure (referred to as "fastening hydraulic pressure") is supplied to the hydraulic chamber 45 of the low clutch 40 to change the low clutch 40 to the fastened state. The first hydraulic pressure is supplied to the B chamber 64 of the LR brake 60. The second hydraulic pressure is supplied to the A chamber 65. Both of the low clutch 40 and the LR brake 60 are fastened. Since fastening hydraulic pressure of the low clutch 40 is higher than the reference hydraulic pressure, the low clutch pressure switch 207 is on.

The mechanical oil pump (OP) 102 is driven by the engine to generate hydraulic pressure. The electrical oil pump (OP) 101 does not generate hydraulic pressure because the motor 101*a* is off. Therefore, the spool 103*a* of the pump switching valve 103 shifts leftward in FIG. 6 (written as "mechanical OP side" in FIG. 8). The hydraulic pressure generated by the mechanical pump 102 is supplied to the low clutch 40 and the LR brake 60 via the oil paths 113, 114, the low clutch line 115 and the LR brake line 116.

Although not shown in the figure, the ON/OFF SV 108 is ON (energized). Consequently, the ON/OFF SV 108 of the normal open type is set to a close state in FIG. 6, the spool of the LR shift valve 107 shifts leftward. The LR brake line 116 is communicated with the B chamber line 118 and the A chamber line 119. The ON/OFF SV 108 is turned off (non-energized) in the transmission stages other than the forward first speed and the reverse speed in which the LR brake 60 is fastened. Since the third LSV 109 is set to a close state, hydraulic pressure is not supplied to the R35 brake 80 fastened in the reverse speed.

When the brake pedal is stepped for example in order that the vehicle stops to wait for a change in a traffic light (the vehicle speed and the turbine speed=0), there is a decrease in an acceleration operation amount, vehicle speed, engine speed, and turbine speed (=output speed of a torque converter=the number of revolutions of the input shaft 2 of the automatic transmission 1). In such a state, the idling stop state flag changes from 0 to 1 (time t1). At this moment, the basic condition of stop conditions of the idling stop control is satisfied since the brake pedal is stepped on so that the vehicle speed is substantially zero.

When the basic condition is satisfied, the control device 200 turns on the motor 101*a* to start driving the electric oil pump 101. Consequently, the electric oil pump 101 is driven by the motor 101*a* to generate hydraulic pressure. The generated hydraulic pressure is led to the pump switching valve 103. The spool 103*a* shifts rightward in FIG. 6 (written as "electric OP side" in FIG. 8). The hydraulic pressure generated by the electric oil pump 101 is supplied to the low clutch 40 and the LR brake 60 via the oil paths 111, 112 and the low clutch line 115 and the LR brake line 116. At this moment, the hydraulic pressure of the electric oil pump 101 is supplied to the low clutch 40 and the LR brake 60, instead of the hydraulic pressure of the mechanical oil pump 102 which has been supplied so far.

The control device 200 then determines whether additional conditions of the stop conditions of the idling stop control are satisfied. The control device 200 may determine whether the residual capacity of a battery is no less than a predetermined amount. The control device 200 may determine whether a difference between a set temperature of an air conditioner and an interior temperature of the vehicle is no larger than a predetermined value. In short, the control device 200 determines whether an engine stop is acceptable. Accordingly, the idling stop state flag changes from 1 to 2 (time t2) when the additional conditions are satisfied. Consequently, the control device 200 automatically stops the engine. The mechanical oil pump 102 stops generating hydraulic pressure in response to the engine stop. At this moment, the hydraulic pressure of the electric oil pump 101 has been already supplied to the low clutch 40 and the LR brake 60 as described above. Therefore, the stop of the mechanical oil pump 102 does not cause any problem.

The control device 200 controls the second LSV 106 simultaneously with the engine automatic stop to reduce the A chamber pressure of the LR brake 60 from the second hydraulic pressure to third hydraulic pressure. The third hydraulic pressure (e.g., several to kPa) is lower than the second hydraulic pressure. Therefore, the A piston 63 stops pressing the friction plates 68 to set the LR brake 60 to the released state. Consequently, the forward first speed is not achieved so that a power transmission route of the automatic transmission 1 is blocked. The symbol "α" in FIG. 8 indicates a period (an unachieved period of the forward first speed) in which the power transmission route of the automatic transmission 1 is blocked. Since the A chamber pressure is changed to a low pressure state, power consumption of the electric oil pump 101 may be small. Consequently, fuel performance is improved.

The control device 200 then determines whether the range of the automatic transmission 1 has been switched from the ID range to the P range. When D→P selecting operation is performed, the control device 200 controls the first LSV 105 to cause dissipation of the low clutch pressure (the fastening hydraulic pressure). This results in a failsafe because the power transmission route is surely blocked. There is no generation of a driving force when the shift range is in the P range. As a result of the dissipation of the low clutch pressure, the low clutch pressure decreases to no larger than the reference hydraulic pressure, so that the low clutch pressure switch 207 is turned off.

In short, while the engine is stopped automatically in the D range, the control device 200 supplies the fastening hydraulic pressure to the hydraulic chamber 45 of the low clutch 40, supplies the first hydraulic pressure to the B chamber 64 of the LR brake 60, and supplies the third hydraulic pressure to the A chamber 65 of the LR brake 60. The third hydraulic pressure is lower than the second hydraulic pressure. The third hydraulic pressure does not cause negative pressure in the A chamber 65. The third hydraulic pressure changes the LR brake 60 to the released state but maintains the zero clearance position of the A piston 63 in the LR brake 60 in the released state. A value of such third hydraulic pressure is experimentally calculated in advance (e.g. a value not smaller than 0 kPa). While the engine is stopped automatically in the P range, the control device 200 causes dissipation of the fastening hydraulic pressure of the low clutch 40 in the hydraulic pressure controlled state in the D range to change both of the low clutch 40 and the LR brake 60 fastened in the forward first speed to the released state.

The control device 200 then determines whether the P→D selecting operation has been performed. It is one of the restart conditions of the idling stop control whether the P→D selecting operation has been performed. If the P→D selecting operation has been performed, the driver has shown an intention of a start. When the restart condition is satisfied, the idling stop state flag changes from 2 to 3 (time t3). Consequently, the control device 200 restarts the engine (the P→D selecting restart).

The mechanical oil pump 102 is driven by the engine in response to the engine restart to resume generation of hydraulic pressure. The control device 200 turns of the motor 101a to stop driving the electric oil pump 101 simultaneously with the engine restart (i.e. simultaneously with the resumption of the hydraulic pressure generation of the mechanical oil pump 102). Consequently, the spool 103a of the pump switching valve 103 shifts to the mechanical OP side again. The hydraulic pressure of the mechanical oil pump 102 is supplied to the low clutch 40 and the LR brake 60.

The control device 200 controls the second LSV 106 simultaneously with the engine restart to increase the A chamber pressure of the LR brake 60 from the third hydraulic pressure to the second hydraulic pressure as indicated by the symbol A in FIG. 8. Consequently, the A piston 63 staying on standby in the zero clearance position presses the friction plates 68 substantially simultaneously with the supply of the hydraulic pressure. Meanwhile, the IR brake 60 is responsively set to the fastened state. At this moment immediately after the engine restart, the hydraulic pressure generated by the mechanical oil pump 102 is still relatively low, the mechanical oil pump 102 being driven by the engine. Since there is no return spring in the LR brake 60 as described above, the A piston 63 is not urged to the release side. Therefore, even if the generated hydraulic pressure of the mechanical oil pump 102 is low, the A piston 63 sufficiently and satisfactorily presses the friction plates 68. The LR brake 60 is set quickly to the fastened state. Since the driving of the electric oil pump 101 may be stopped early (a driving time may be short), power consumption of the motor 101a may be reduced to a low level. Accordingly, fuel performance is improved.

When the A chamber pressure of the LR brake 60 reaches the second hydraulic pressure, the control device 200 controls the first LSV 105 to increase the low clutch pressure toward the fastening hydraulic pressure (time t4). The low clutch pressure increases to be higher than the reference hydraulic pressure. The low clutch pressure switch 207 is then turned on. Consequently the low clutch 40 is set to the fastened state. Since the LR brake 60 is fastened earlier, the forward first speed is achieved. As indicated by the symbol α, the blocked power transmission route of the automatic transmission 1 is formed again. At this moment, since the low clutch pressure is increased after the pressure increase of the A chamber pressure, the generated hydraulic pressure of the mechanical oil pump 102 is sufficiently high in comparison with immediately after the engine start. As described above, even if the return spring 46 is provided in the low clutch 40 to urge the piston 44 to the release side, the piston 44 of the e low clutch 40 sufficiently and satisfactorily moves to the fastening side. Therefore the low clutch 40 is set quickly to the fastened state.

Since the brake pedal is still stepped on at this moment, there is no rise in vehicle speed even if the power transmission route is formed again. The turbine speed increases in association with the engine speed until the power transmission route is formed again. After the power transmission route is formed again, the turbine speed decreases to 0 once. The vehicle speed and the turbine speed rise as soon as the vehicle is started by the driver stopping stepping on the brake pedal whereas the driver steps can the accelerator pedal (time t5).

With regard to the example shown in FIG. 8 (the range is switched to perform D→P→D shift), the starting stage (the forward first speed) of the D range during the engine restart is responsively implemented after the vehicle stops in the D range.

[N→D Selecting Restart]

Another example of the control operation performed by the control device 200 is described with reference to FIG. 9. With regard to the example shown in FIG. 8, the range is switched to perform D→P→D shift during the idling stop control. With regard to the example shown in FIG. 9, the range is switched to perform D→N→D shift (N→D selecting restart).

The P range and the N range are non-trawling ranges. However, the N range is different from the P range in that the low clutch pressure in the N range during the automatic engine stop is much higher than the reference hydraulic pressure of the low clutch pressure switch 207, in comparison with the automatic stop in the P range. The forward first speed is responsively achieved during the engine restart to realize a quick start of the vehicle.

Figure 9:
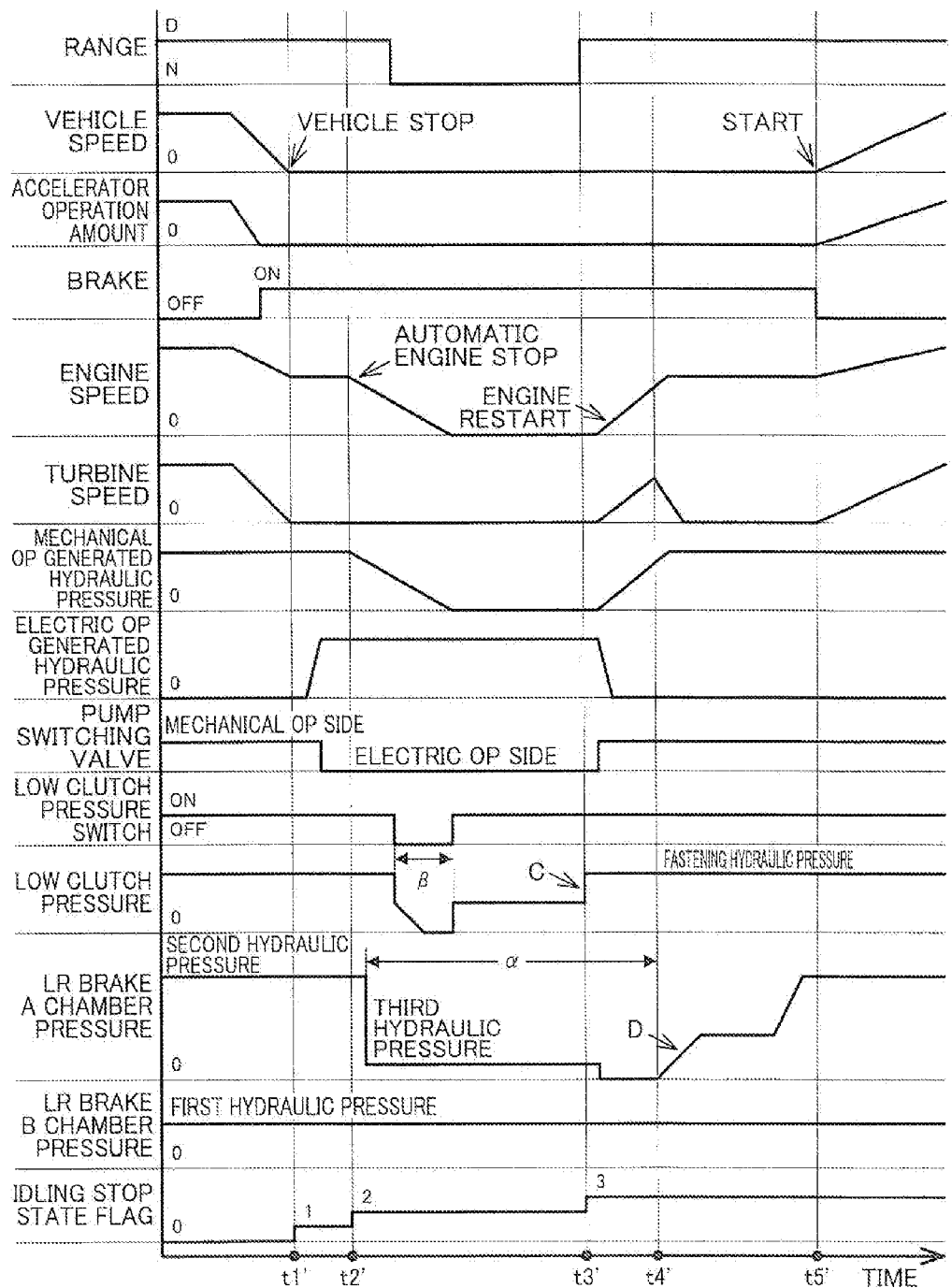
FIG. 9 is a time chart showing an exemplificative control operation when the range of the automatic transmission is switched to perform D→N→D shift.

With regard to FIG. 9, the idling stop state flag changes from 0 to 1 at the time t1. The flag changes from 1 to 2 at the time t2'. The flag changes from 2 to 3 at the time t3'. The engine speed reaches a predetermined reference speed at the time 4' after the engine restart (or the low clutch pressure increases to the fastening hydraulic pressure). The vehicle starts at the time 5'. In comparison with FIG. 8, since the control operation is different after the time t2', only differences after the time t2' are described. In FIG. 9, a period of decrease in the engine speed as a result of the engine automatic stop is shown relatively long. However, this is for convenience of explanation. Actually, decrease speed of the engine speed is not low.

After a reduction in the A chamber pressure of the LR brake 60 from the second hydraulic pressure to the third hydraulic pressure simultaneously with the engine automatic stop, the control device 200 determines whether the range of the automatic transmission 1 has been switched from the D range to the N range in a period of a decrease in the engine speed as a result of the engine automatic stop. If D→N selecting operation is performed in the decrease period of the engine speed, the control device 200 controls the first LSV 105 to cause dissipation of the low clutch pressure (the fastening hydraulic pressure). The power transmission route is surely blocked while the engine still rotates. Therefore, there is no generation of a driving force when the shift range is in the N range. As a result of the dissipation of the low clutch pressure, the low clutch pressure decreases to be not greater than the reference hydraulic pressure so that the low clutch pressure switch 207 is turned off.

The control device 200 controls the first LSV 105 to increase the low clutch pressure to desired standby hydraulic pressure when the engine speed decreases to 0. The standby hydraulic pressure is lower than the fastening hydraulic pressure but higher than the reference hydraulic pressure of the low clutch pressure switch 207. Therefore, the low clutch pressure switch 207 is turned on again. As indicated by the symbol β in FIG. 9, the low clutch pressure switch 207 is temporarily turned off only while the engine speed decreases to 0 after the D→N selecting operation is performed. As described above, generation of a driving force while the engine still rotates is avoided by the turn-off of the low clutch pressure switch 207. On the other hand, the low clutch pressure switch 207 is turned on after the engine speed decreases to 0. As described above, a quick start of the vehicle during the engine restart is realized by the turn-on of the low clutch pressure switch 207.

Instead of the example shown in FIG. 9, the control device 200 may directly reduce the low clutch pressure from the fastening hydraulic pressure to the standby pressure without dissipation of the low clutch pressure once if the selecting operation is performed after the engine speed decreases to 0 because there is no generation of a driving force when the shift range is in the N range. In this case, the low clutch pressure switch 207 is not turned off.

In short, while the engine is stopped automatically in the N range, the control device. 200 reduces the low clutch pressure except the period β to the standby hydraulic pressure in the hydraulic pressure controlled state in die D range to set the LR brake 60 to the released state.

The control device 200 then determines whether the selecting operation is performed. It is one of the restart conditions of the idling stop control whether the N→D selecting operation is performed. The idling stop state flag changes from 2 to 3 (time t3') when the restart condition is satisfied. Consequently, the control device 200 restarts the engine (the selecting restart).

The control device 200 controls the first LSV 105 simultaneously with the engine restart. As indicated by the symbol C in FIG. 9, the control device 200 increases the low clutch pressure from the standby hydraulic pressure toward the fastening hydraulic pressure. Consequently, the low clutch 40 is set to the fastened state. At this moment immediately after the engine restart, the hydraulic pressure generated by the mechanical oil pump 102 is still relatively low, the mechanical oil pump 102 being driven by the engine. As described above, the return spring 46 is provided in the low clutch 40 to urge the piston 44 to the release side. However, the low clutch pressure does not dissipate while the engine is stopped automatically in the N range. The standby hydraulic pressure higher than the reference hydraulic pressure is supplied to the low clutch 40. Therefore, even if the generated hydraulic pressure of the mechanical oil pump 102 is low and even if the return spring 46 is provided in the low clutch 40, the low clutch 40 is set to the fastened state more quickly than when the low clutch pressure dissipates. Since the driving of the electric oil pump 101 may be stopped early (a driving time may be short), power consumption of the motor 101a may be small. Accordingly, fuel performance is improved.

The control device 200 controls the second LSV 106 simultaneously with the engine restart to cause dissipation of the A chamber pressure (the third hydraulic pressure) of the LR brake 60. The power transmission route is surely blocked so that an input of output torque of the engine to the power transmission route is less likely to cause a shock. The control device 200 maintains the dissipation of the third hydraulic pressure until the engine speed reaches predetermined reference speed (until the time t4'). A value of such reference speed is experimentally calculated in advance in light of the shock reduction.

The control device 200 controls the second LSV 106 at the time t4 (the low clutch pressure increases to the fastening hydraulic pressure by time t4' at the latest) to increase the A chamber pressure of the LR brake 60 toward the second hydraulic, pressure as indicated by the symbol D in FIG. 9. Consequently, the A piston 63 staying on standby in the zero clearance position presses the friction plates 68 substantially simultaneously with the supply of the hydraulic pressure, so that the LR brake 60 is responsively set to the fastened state. At this moment, since the pressure of the A chamber pressure is increased after an increase in the low clutch pressure, the generated hydraulic pressure of the mechanical oil pump 102 is sufficiently high. As described above, since there is no return spring in the LR brake 60. The A piston 63 is not urged to the release side. Therefore. The A piston 63 sufficiently and satisfactorily presses the friction plates 68, so that the LR brake 60 is set quickly to the fastened state. Since the low clutch 40 is fastened earlier, the forward first speed is achieved. As indicated by the symbol α, the blocked power transmission route of the automatic transmission 1 is formed again, at the time t4'.

Since the brake pedal is still stepped on at this moment, there is no rise in a vehicle speed even if the power transmission route is formed again. The turbine speed increases in association with the engine speed until the power transmission route is formed again. After the power transmission route is formed again, the turbine speed decreases to 0 once. The vehicle speed and the turbine speed rise as soon as the vehicle starts when the driver stops stepping on the brake pedal and then steps on the accelerator pedal (time t5').

With regard to the example shown in FIG. 9 (the range is switched to perform D→N→D shift), the starting stage (the forward first speed) of the D range during the engine restart is responsively implemented after the vehicle stops in the D range.

Figure 10:
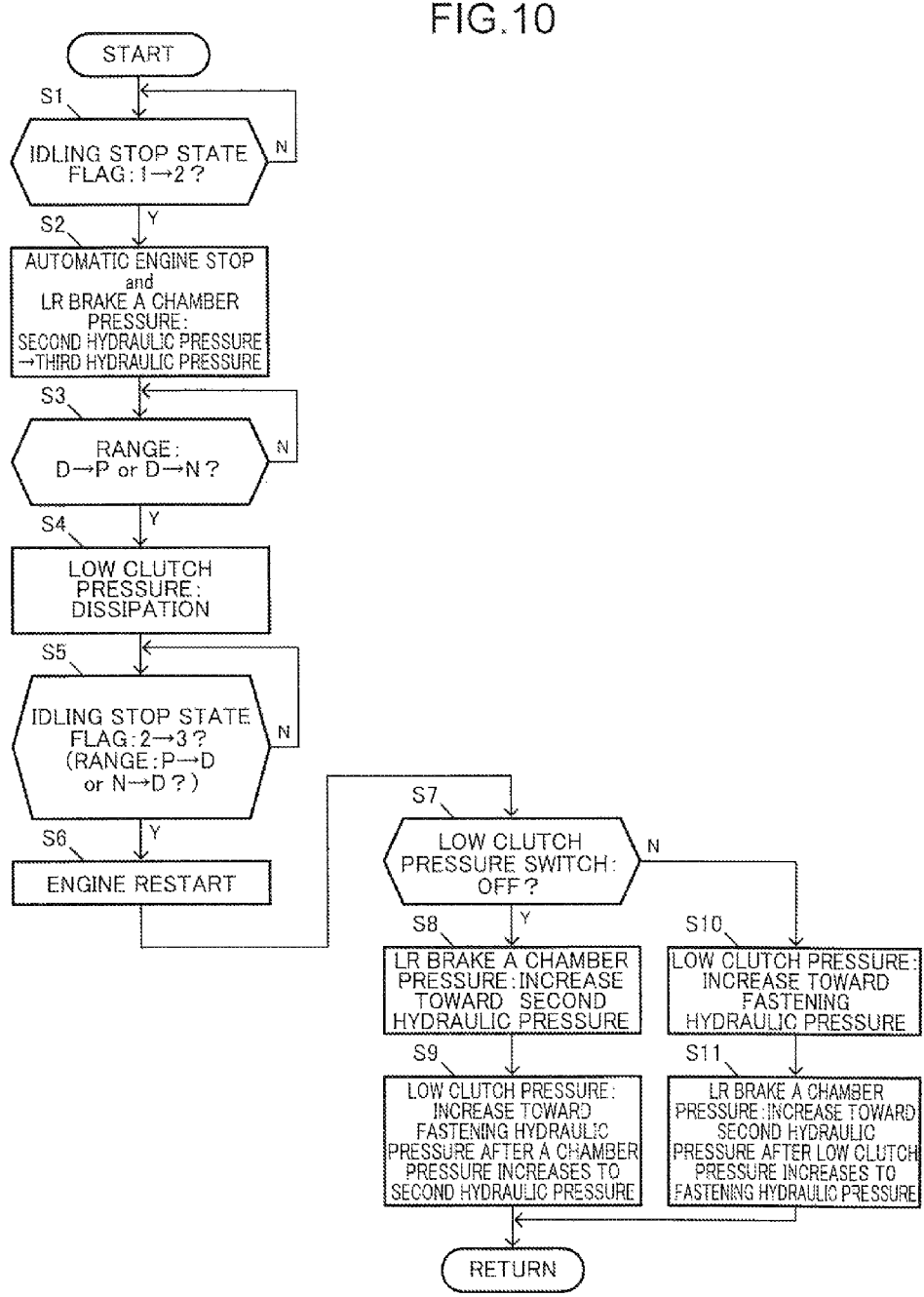
FIG. 10 is a flowchart of the control operations in FIGS. 8 and 9.

FIG. 10 is a flowchart representing the control operations in FIGS. 8 and 9 performed by the control device 200. However, only the excerpts of main characteristic processes are shown.

In step S1, the control device 200 determines whether the idling stop state flag has changed from 1 to 2. When determining YES (time t2 and time t2 in FIGS. 8 and 9), the control device 200 automatically stops the engine in step S2. When the engine speed decreases to be no larger than a predetermined threshold, the control device 200 reduces the A chamber pressure of the LR brake 60 from the second hydraulic pressure to the third hydraulic pressure.

In subsequent step S3, the control device 200 determines whether the range of the automatic transmission 1 has switched from the D range to the P range or from the D range to the N range. When determining YES, the control device 200 causes dissipation of the low clutch pressure in step S4. In the case of D→N, when the engine speed then decreases to 0, the control device 200 further supplies the standby hydraulic pressure to the low clutch 40. In the case of D→N after the engine speed changes to 0, the control device 200 reduces the low clutch pressure to the standby hydraulic pressure without dissipation of the low clutch pressure.

In subsequent step S5, the control device 200 determines whether the idling stop state flag changes from 2 to 3 (i.e. the selecting operation or the N→D selecting operation has been performed to switch the range). When determining YES (time t3 and time t3" in FIGS. 8 and 9), the control device 200 restarts the engine in step S6.

In subsequent step S7, the control device 200 determines whether the low clutch pressure switch 207 is off. The control device 200 proceeds to step S8 when the low clutch pressure switch 207 is off (in the case of FIG. 8). The control device 200 proceeds to step S10 when the low clutch pressure switch 207 is on (in the case of FIG. 9).

In step S8, the control device 200 increases the A chamber pressure of the LR brake 60 toward the second hydraulic pressure (the symbol A in FIG. 8).

In subsequent step S9, the control device 200 increases the low clutch pressure toward the fastening hydraulic pressure (the symbol B in FIG. 8) after the A chamber pressure of the LR brake 60 increases to the second hydraulic pressure.

On the other hand, the control device 200 in step S10 increases the low clutch pressure (the standby hydraulic pressure) toward the fastening hydraulic pressure (the symbol C in FIG. 9).

In subsequent step S11, the control device 200 increases the A chamber pressure of the LR brake 60 toward the second hydraulic pressure (the symbol D in FIG. 9) after the low clutch pressure increases to the fastening hydraulic pressure (at the time t4').

[P→R Selecting Restart]

Yet another example of the control operation performed by the control device 200 is described with reference to FIG. 11. With regard to the examples shown in FIGS. 8 and 9, the range is switched to perform D→P→D shift or shift during the idling stop control. With regard to the example shown in FIG. 11, the range is switched to perform D→P→R shift (P→R selecting restart).

The D range and the R range are traveling ranges. However, the D range and the R range are different in that the low clutch 40 and the LR brake 60 are fastened in the starting stage (the forward first speed) of the D range whereas the LR brake 60 and the R35 brake 80 are fastened in the starting stage (the reverse stage) of the R range.

Figure 11:
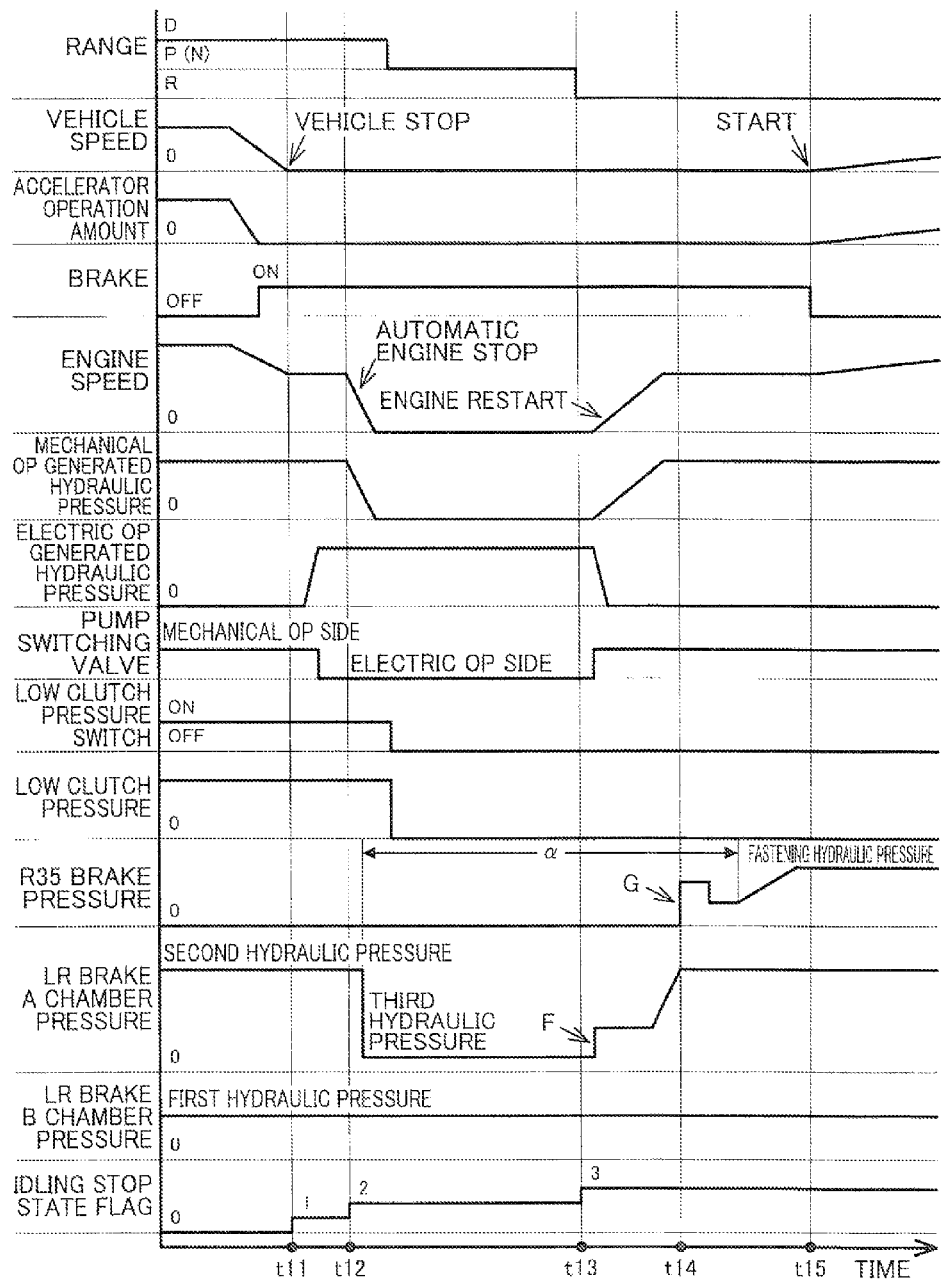
FIG. 11 is a time chart showing an exemplificative control operation when the range of the automatic transmission is switched to perform D→P→R shift.

With regard to FIG. 11, the idling stop state flag changes from 0 to 1 at the time t11. The flag changes from 1 to 2 at the time t12. The flag changes from 2 to 3 at the time t13. The A chamber pressure reaches the second hydraulic pressure to start increasing the R35 brake pressure at the time t14. The vehicle starts at the time t15. In comparison with FIG. 8, since the control operation is different after the time t13, only differences after the time t13 are described. In FIG. 11, the turbine speed is omitted but the R35 brake pressure is added. As clearly shown in FIG. 11, hydraulic pressure is supplied to the R35 brake 80 until the time t14 (the R35 brake pressure≠0).

An automatic stop happens to the engine if the fastening hydraulic pressure dissipates from the low clutch 40 so that hydraulic, pressure (the fastening hydraulic pressure) for setting the R35 brake 80 to the fastened state is not supplied to the hydraulic chamber 85 of the R35 brake 80 and if the first hydraulic pressure is supplied to the B chamber 64 of the LR brake 60 whereas the second hydraulic pressure is not supplied to the A chamber 65 of the LR brake 60. The control device 200 determines whether the P→R selecting operation is performed during the automatic stop of the engine. It is one of the restart conditions of the idling stop control in the P range whether the P→R selecting operation is performed. When the restart condition is satisfied, the idling stop state flag changes from 2 to 3 (time t13). Consequently, the control device 200 restarts the engine (the P→R selecting restart).

The control device 200 controls the second LSV 106 simultaneously with the engine restart. As indicated by the symbol F in FIG. 11, the control device 200 increases the A chamber pressure of the LR brake 60 from the third hydraulic pressure to the second hydraulic pressure. Consequently, the A piston 63 staying on standby in the zero clearance position presses the friction plates 68 substantially simultaneously with the supply of the hydraulic pressure. The LR brake 60 is responsively set to the fastened state. At this moment immediately after the engine restart, the hydraulic, pressure generated by the mechanical oil pump 102 is still relatively low, the mechanical oil pump being driven by the engine. As described above, since there is no return spring in the LR brake 60, the A piston 63 is not urged to the release side. Therefore, the A piston 63 sufficiently and satisfactorily presses the friction plates 68 even if the generated hydraulic pressure of the mechanical oil pump 102 is low. The LR brake 60 is set quickly to the fastened state. Since the driving of the electric oil pump 101 may be stopped early (a driving time may be short), power consumption of the motor 101*a* may be small. Consequently, fuel performance is improved.

When the A chamber pressure of the LR brake 60 reaches the second hydraulic pressure, the control device 200 controls the third LSV 109 to increase the R35 brake pressure toward the fastening hydraulic pressure as indicated by the symbol G in FIG. 11 (time t14). Consequently, the R35 brake 80 is set to the fastened state. Since the LR brake 60 is fastened earlier, the reverse speed is achieved. As indicated by the symbol α, the power transmission route of the automatic transmission 1, which has been blocked, is formed again. At this moment, since the pressure of the R35 brake pressure is increased after the pressure increase of the A chamber pressure, the generated hydraulic pressure of the mechanical oil pump 102 is sufficiently high in comparison with immediately after the engine start. Therefore, the piston 84 of the R35 brake 80 sufficiently and satisfactorily moves to the fastening side as described above even if the return spring 86 is provided in the R35 brake 80 to urge the piston 84 to the release side. The R35 brake 80 is set quickly to the fastened state.

Since the brake pedal is still stepped on at this moment, the vehicle speed does not rise even if the power transmission route is formed again. The turbine speed increases in association with the engine speed until the power transmission route is formed again. After the power transmission route is formed again, the turbine speed decreases to 0 once. The vehicle speed and the turbine speed rise as soon as the vehicle starts when the driver stops stepping on the brake pedal, and then steps on the accelerator pedal (time t15).

The low clutch pressure decreased by the selecting operation while the engine is stopped automatically in the D range is kept decreased during the idling stop control. The low clutch pressure switch 207 turned off in response to the reduction in the low clutch pressure is kept off during the idling stop control.

With regard to the example shown in FIG. 11, the range is switched to perform shift. The starting stage (the reverse speed) of the R range during the engine restart is responsively implemented after the vehicle stops in the D range.

Figure 12:
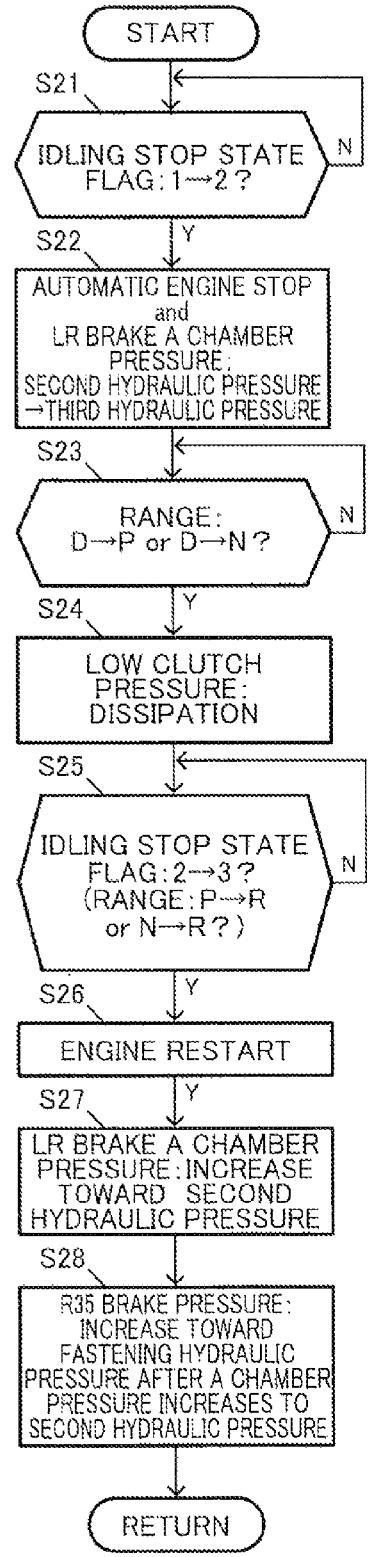
FIG. 12 is a flowchart of the control operation in FIG. 11.

FIG. 12 is a flowchart representing the control operation in FIG. 11 performed by the control device 200. Only the excerpts of main characteristic processes are shown.

In step S21, the control device 200 determines whether the idling stop state flag has changed from 1 to 2. When determining YES (time t12 in FIG. 11), the control device 200 automatically stops the engine in step S22. When the engine speed then, decreases to be not larger than the predetermined threshold, the control device 200 reduces the A chamber pressure of the LR brake 60 from the second hydraulic pressure to the third hydraulic pressure.

In subsequent step S23, the control device 200 determines whether the range of the automatic transmission 1 has been switched from the D range to the P range. When determining YES, the control device 200 causes dissipation of the low clutch pressure in step S24.

In subsequent step S25, the control device 200 determines whether the idling stop state flag has changed from 2 to 3 (i.e., the P→R selecting operation has been performed to switch the range). When determining YES (time t13 in FIG. 1), the control device 200 restarts the engine in step S26.

It is also described in FIG. 12 that the control device 200 determines in step S23 whether the range of the automatic transmission 1 has been switched from the D range to the N range. The control device 200 determines in step S25 whether the selecting operation has been performed to switch the range. These determinations are described below.

In subsequent step S27, the control device 200 increases the A chamber pressure of the LR brake 60 toward the second hydraulic pressure (the symbol F in FIG. 11).

In subsequent step S28, the control device 200 increases the R35 brake pressure toward the fastening hydraulic pressure (the symbol G in FIG. 11) after the A chamber pressure of the LR brake 60 increases to the second hydraulic pressure.

[D→R Selecting Restart]

Yet another example of the control operation performed by the control device 200 is described with reference to FIG. 13. With regard to the examples shown in FIGS. 8 to 11. The range is switched to perform shift of the traveling range→the non-traveling range→the traveling range during the idling stop control. With regard to the example shown in FIG. 13, the range is switched to perform shift of the forward traveling range→the reverse traveling range (D→R selecting restart).

Figure 13:
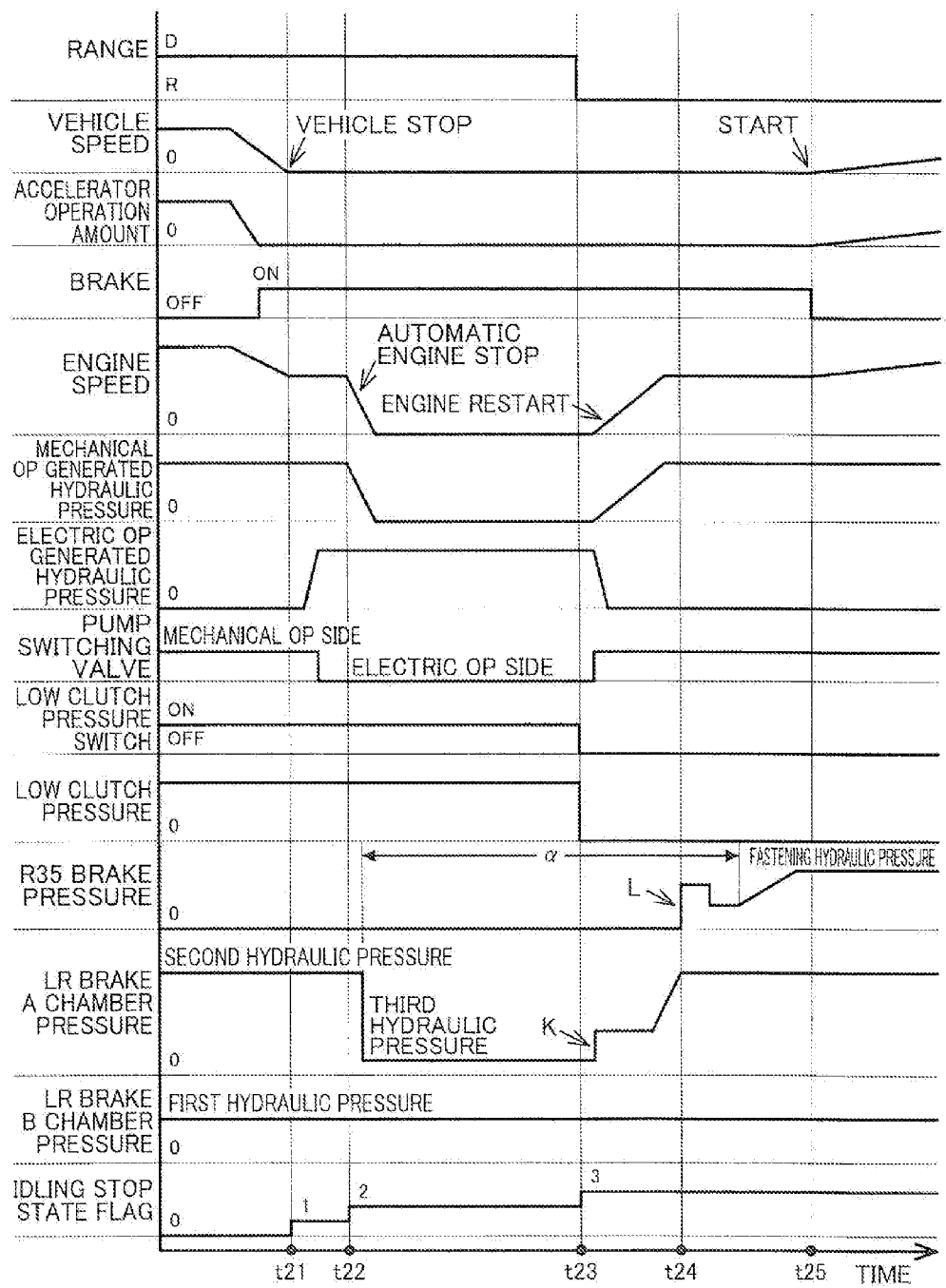
FIG. 13 is a time chart showing an exemplificative control operation when the range of the automatic transmission is switched to perform D→R shift.

In FIG. 13, the idling stop state flag changes from 0 to 1 at the time t21. The flag changes from 1 to 2 at the time t22. The flag changes from 2 to 3 at the time t23. The A chamber pressure reaches the second hydraulic pressure at the time t24 so that an increase in the 135 brake pressure starts. The vehicle starts at the time t25. Since the control operation is different after the time t22 in comparison with FIG. 11, only differences after the time t22 are describe. As clearly shown in FIG. 13, the fastening hydraulic pressure is supplied to the low clutch 40 until the time t23.

An automatic stop happens to the engine in the D range if the fastening hydraulic pressure is supplied to the low clutch 40 whereas the fastening hydraulic pressure is not supplied to the R35 brake 80 and if the first hydraulic pressure is supplied to the B chamber 64 of the LR brake 60 whereas the second hydraulic pressure is not supplied to the A chamber 65 of the LR brake 60. The control device 200 determines whether the selecting operation has been performed during the automatic engine stop. It is one of the restart conditions of the idling stop control whether the D→R selecting operation has been performed. When the restart condition is satisfied, the idling stop state flag changes from 2 to 3 (time t23). Consequently, the control device 200 restarts the engine (the D→R selecting restart).

The control device 200 controls the first LSV 105 simultaneously with the engine restart to cause dissipation of the clutch pressure (the fastening hydraulic pressure the low clutch pressure decreases to be not higher than the reference hydraulic pressure. The low clutch pressure switch 207 is turned off.

The control device 200 controls the second LSV 106 simultaneously with the engine restart to increase the A chamber pressure of the LR brake 60 from the third hydraulic pressure toward the second hydraulic pressure as indicated by the symbol K. Consequently the A piston 63 staying, on standby in the zero clearance position presses the friction plates 68 substantially simultaneously with the supply of the hydraulic pressure. The LR brake 60 is responsively set to the fastened state. At, this moment immediately after the engine restart, the hydraulic pressure generated by the mechanical oil pump 102 is still relatively low, the mechanical oil pump 102 being driven by the engine. As described above, there is no return spring in the LR brake 60, the A piston 63 is not urged to the release side. Therefore, the A piston 63 sufficiently and satisfactorily presses the fraction plates 68 even if the e generated hydraulic pressure of the mechanical oil pump 102 is low. The LR brake 60 is set quickly to the fastened state. Since the driving of the electric oil pump 101 may be stopped early (a driving time may be short), power consumption of the motor 101a may be small. Accordingly, fuel performance is improved.

When the A chamber pressure of the LR brake 60 reaches the second hydraulic pressure, the control device 200 controls the third LSV 109 to increase the R35 brake pressure toward the fastening hydraulic pressure as indicated by the symbol L in FIG. 13 (time t24). Consequently, the R35 brake 80 is set to the fastened state. Since the LR brake 60 is fastened earlier, the reverse speed is achieved. As indicated by the symbol α, the power transmission route of the automatic transmission 1, which has been blocked, is formed again.

Since the pressure of the R35 brake pressure increased after an increase in the A chamber pressure, the generated hydraulic pressure of the mechanical oil pump 102 is sufficiently high in comparison with immediately after the engine start. Therefore, the piston 84 of the R35 brake 80 sufficiently and satisfactorily moves to the fastening side as described above even if the return spring 86 is provided in the R35 brake 80 to urge the piston 84 to the release side. The R35 brake 80 is set quickly to the fastened state.

Since the brake pedal is still stepped on at this moment even if the power transmission route is formed again, the vehicle speed does not rise. The turbine speed increases in association with the engine speed until the power transmission route is formed again. After the power transmission route is formed again, the turbine speed decreases to 0 once. The vehicle speed and the turbine speed rise as soon as the vehicle starts when the driver stops stepping on the brake pedal, and then steps on the accelerator pedal time t25).

The low clutch pressure decreased by the D→R selecting operation during the automatic engine stop in the D range is kept decreased during the idling stop control. The low clutch pressure switch 207 turned off by the decrease in the low clutch pressure is kept off during the idling stop control.

With regard to the example shown in FIG. 13, the range is switched to perform shift. The starting stage (the reverse speed) of the R range during the engine restart is responsively implemented after the vehicle stops in the D range.

Figure 14:
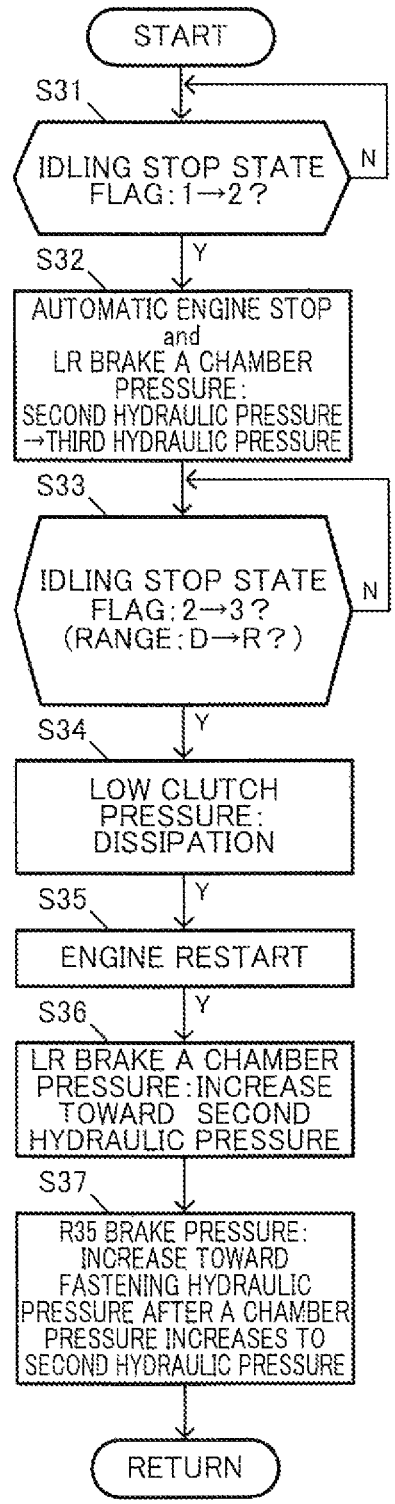
FIG. 14 is a flowchart of the control operation in FIG. 13.

FIG. 14 is a flowchart representing the control operation in FIG. 13 performed by the control device 200. Only the excerpts of main characteristic processes are shown.

In step S31, the control device 200 determines whether the idling stop state flag has changed from 1 to 2. When determining YES (time t22 in FIG. 13), the control device 200 automatically stops the engine in step S32. When the engine speed then decreases to be not larger than the predetermined threshold, the control device 200 reduces the A chamber pressure of the LR brake 60 from the second hydraulic pressure to the third hydraulic pressure.

In subsequent step S33, the control device 200 determines whether the idling stop state flag has changed from 2 to 3 (i.e. the D→R selecting operation has been performed to switch the range). If YES (time t23 in FIG. 13), the low clutch pressure dissipates in step S34 so that the engine is restarted in step S35.

In FIG. 36, the control device 200 increases the A chamber pressure of the LR brake 60 toward the second hydraulic pressure (the symbol K in FIG. 13).

In subsequent step S37, the control device 200 increases the R35 brake pressure toward the fastening hydraulic pressure (the symbol L in FIG. 11) after the A chamber pressure of the LR brake 60 increases to the second hydraulic pressure.

(2) Action

As described in detail above with reference to the drawings, the control device for the automatic transmission 1 according to this embodiment is mounted in the vehicle (the idling stop vehicle). The vehicle includes the control device 200 that performs the idling stop control for automatically stopping the engine when the predetermined stop conditions are satisfied and restarting the engine when the predetermined restart conditions are satisfied in the engine automatically stopped state. The automatic transmission 1 includes the low clutch 40 and the LR brake 60 fastened in the forward first speed the forward starting stage). The automatic transmission 1 also includes the LR brake 60 and the R35 brake 80 fastened in the reverse speed (the reverse starting stage). The control device 200 performs the control of the hydraulic pressure for fastening the low clutch 40, the LR brake 60 and the R35 brake 80 (FIGS. 6 and 7).

The low clutch 40 and the R35 brake 80 include the return springs 46, 86 which urge the pistons 44, 84 of the low clutch 40 and the R35 brake 80 to the release side (FIGS. 15 and 16).

The LR brake 60 includes the friction plates 68, the pressing piston 63, which presses the friction plates 68, and the clearance adjustment piston 62, which supports the pressing piston 63 to allow relative movement of the pressing piston 63. The LR brake 60 is configured as follows (FIGS. 3 to 5). The clearance adjustment piston 62 moves when the first hydraulic pressure is supplied to the clearance adjustment piston 62. Consequently, the pressing piston 63 comes into contact with the friction plate 68 so that the clearance of the friction plate 68 decreases to zero. The pressing piston 63 presses the friction plates 68 when the second hydraulic pressure is supplied to the pressing piston 63 in this state. Consequently, the LR brake 60 is set to the fastened state.

With regard to the selecting restart shown in FIGS. 8 and 10, an automatic stop in the P range happens to the engine if the fastening hydraulic pressure for setting the low clutch 40 to the fastened state is not supplied to the low clutch 40 whereas the first hydraulic pressure is supplied to the clearance adjustment piston 62 and if the second hydraulic pressure is not supplied to the pressing piston 63. The control device 200 supplies the fastening hydraulic oil to the low clutch 40 (the symbol B in FIG. 8) after supplying the second hydraulic pressure to the pressing piston 63 (the symbol A in FIG. 8) when the engine is restarted by selecting operation for switching to the D range in which all of the fastening hydraulic pressure, the first hydraulic pressure and the second hydraulic pressure are supplied.

With regard to the P→R selecting restart shown in FIGS. 11 and 12, an automatic stop in the P range happens to the engine if the fastening hydraulic pressure for setting the R35 brake 80 to the fastened state is not supplied to the R35 brake 80 whereas the first hydraulic pressure is supplied to the clearance adjustment piston 62 and if the second hydraulic pressure is not supplied to the pressing piston 63. The control device 200 supplies the fastening hydraulic oil to the R35 brake 80 the symbol G in FIG. 11) after supplying the second hydraulic pressure to the pressing piston 63 (the symbol F in FIG. 11) when the engine is restarted by selecting operation for switching to the R range in which all of the fastening hydraulic pressure the first hydraulic pressure, and the second hydraulic pressure are supplied.

With regard to the D→R selecting restart shown in FIGS. 13 and 14, an automatic stop in the D range happens to the engine if the fastening hydraulic pressure is not supplied to the R35 brake 80 whereas the first hydraulic pressure is supplied to the clearance adjustment piston 62 and if the second hydraulic, pressure is not supplied to the pressing piston 63. The control device 200 supplies the fastening hydraulic oil to the R35 brake 80 (the symbol L in FIG. 13) after supplying the second hydraulic pressure to the pressing piston 63 (the symbol K in FIG. 13) when the engine is restarted by selecting operation for switching to the R range in which all of the fastening hydraulic pressure, the first hydraulic pressure, and the second hydraulic pressure are supplied.

According to this configuration, the automatic transmission 1 has the low clutch 40 or the R35 brake 80, which includes the return spring 46 or 86, and the double acting type LR brake 60, which includes the pressing piston 63 and the clearance adjustment piston 62. The low clutch 40 or the R35 brake 80 is fastened to the double acting type LR brake 60 in the forward first speed (the forward starting stage) or the reverse speed (the reverse starting stage). The engine is stopped automatically by the idling stop control if the fastening hydraulic pressure is not supplied to the low clutch 40 or the R35 brake 80 whereas the first hydraulic pressure is supplied to the clearance adjustment piston 62 of the LR brake 60 and if the second hydraulic pressure is not supplied to the pressing piston 63 of the LR brake 60. The second hydraulic pressure is supplied to the pressing piston 63, and then the fastening hydraulic pressure is supplied to the low clutch 40 or the R35 brake 80 when the engine is restarted by selecting operation for switching to the range in which the fastening hydraulic pressure and the second hydraulic pressure are supplied respectively to the low clutch 40 or the R35 brake 80 and the pressing piston 63.

Since the second hydraulic pressure is supplied immediately after the engine restart to the pressing piston 63 staying on standby in the zero clearance position, the LR brake 60 is responsively set to the fastened state even if the generated hydraulic pressure of the mechanical oil pump 102 driven by the engine is still relatively low. Since the fastening hydraulic pressure is then supplied to the low clutch 40 or the R35 brake 80, the generated hydraulic pressure of the mechanical oil pump 102 at this moment is higher than immediately after the engine restart. Therefore, relatively high hydraulic pressure is supplied to the low clutch 40 or the R35 brake 80 in comparison with when the fastening hydraulic pressure is supplied to the low clutch 40 or the R35 brake $0 earlier than the pressing piston 63 even if the return spring 46 or 86 is provided in the low clutch 40 or the R35 brake 80. Therefore, the low clutch 40 or the R35 brake 80 is set quickly to the fastened state. The forward first speed or reverse speed is responsively achieved when the engine is restarted by the range selecting operation during the automatic engine stop.

With regard to the embodiment, the low clutch pressure switch 207 detects the low clutch pressure supplied to the low clutch 40. When the selecting operation switches the range from the N range to the D range (i.e. the selecting restart shown in FIGS. 9 and 10), the control device 200 supplies the second hydraulic pressure to the pressing piston 63 (the symbol D in FIG. 9) after supplying the fastening hydraulic pressure to the low clutch 40 (the symbol C in FIG. 9) if hydraulic pressure detected by the low clutch pressure switch 207 is higher than the predetermined reference hydraulic pressure (when the switch 207 is on).

With regard to the automatic engine stop in the N range, relatively high hydraulic pressure (the standby hydraulic pressure) may be supplied to the low clutch 40 in order to realize a quick start of the vehicle. When the range is switched to perform shift, the engine is restarted. At this moment, the starting stage (the forward first speed) of the D range fastens the low clutch 40, and then the LR brake 60. Therefore, the fastening control has controllability with a suppressed shock.

In this embodiment, the LR brake 60 is a brake element provided in the transmission case 3.

With this configuration, the LR brake 60 is the double acting type friction element excellent in controllability. The LR brake $0 is a brake element which is not affected by centrifugal hydraulic pressure. Therefore, the fastening responsiveness of the LR brake 60 is further improved.

In this embodiment, the LR brake 60 is fastened in the forward first speed (the forward starting stage) and the reverse speed (the reverse starting stage) (FIG. 2).

Since the fastening responsiveness of the LR brake 60 is improved, it is possible to remove the one-way clutch in the forward first speed. The forward first speed is responsively and reliably achieved when the vehicle starts in the D range after the engine restart. The reverse speed is responsively and reliably achieved when the vehicle starts in the R range. The vehicle may quickly start.

(3) Modifications

With regard to the embodiment, the present invention is applied to the D→D selecting restart, the P→R selecting restart and the D→R selecting restart. The present invention is also applicable to the N→D selecting restart and the N→R selecting restart.

The low clutch pressure switch 207 is temporarily turned off in the period β as described in FIG. 9. For example, the N→D selecting operation may be performed in the period 3, which results in YES in step S7 of FIG. 10. The control device 200 fastens the LR brake 60, and then fastens the low clutch 40.

An automatic stop in the N range happens to the engine if the fastening hydraulic pressure is not supplied to the low clutch 40 whereas the first hydraulic pressure is supplied to the clearance adjustment piston 62 and if the second hydraulic pressure is not supplied to the pressing piston 63. The engine may be restarted during the period β of the automatic engine stop in the N range. In this case, all of the fastening hydraulic pressure, the first hydraulic pressure, and the second hydraulic pressure are supplied by the selecting operation for switching to the D range. Accordingly, the control device 200 may supply the fastening hydraulic pressure to the low clutch 40 after supplying the second hydraulic pressure to the pressing piston 63.

With regard to the example shown in FIG. 9, the range is switched to perform D→N→D shift. The starting stage (the forward first speed) of the D range during the engine restart is responsively implemented after the vehicle stops in the D range.

FIG. 11 shows an automatic engine stop in the N range. Like the automatic engine stop in the D range, it is determined in step S23 of FIG. 12 whether the range of the automatic transmission 1 has been switched from the D range to the N range, and then it is determined in step S25 of FIG. 12 whether the N→R selecting operation has been performed to switch the range.

An automatic stop in the N range happens to the engine if the fastening hydraulic pressure is not supplied to the R35 brake 80 whereas the first hydraulic pressure is supplied to the clearance adjustment piston 62 and if the second hydraulic pressure is not supplied to the pressing piston 63. When the engine is restarted by the selecting operation for switching to the R range during the automatic engine stop in the N range, all of the fastening hydraulic pressure, the first hydraulic pressure, and the second hydraulic pressure are supplied. The control device 200 supplies the fastening hydraulic pressure to the R35 brake 80 (the symbol G in FIG. 11) after supplying the second hydraulic pressure to the pressing piston 63 (the symbol F in FIG. 11).

With regard to the example shown in FIG. 11, the range is switched to perform D→N→R shift. The starting stage (the reverse speed) during the engine restart is responsively implemented after the vehicle stops in the D range.

There is a summary about the aforementioned present invention below.

The present invention provides a control device for an automatic transmission mounted in a vehicle including idling stop means for automatically stopping an engine when a predetermined stop condition is satisfied, and restarting the engine when a predetermined restart condition is satisfied in an engine automatically stopped state. The control device for the automatic transmission includes a first friction element and a second friction element fastened in a starting stage of the automatic transmission; and hydraulic-pressure controlling means for controlling hydraulic pressure for fastening the first and second friction elements. The first friction element includes a return spring that urges a piston of the first friction element to a release side. The second friction element includes a friction plate, a pressing piston that presses the friction plate, and a clearance adjustment piston that supports the pressing piston so as to allow relative movement of the pressing piston. The pressing piston comes into contact with the friction plate so that a clearance of the friction plate decreases to zero when first hydraulic pressure is supplied to the clearance adjustment piston to move the clearance adjustment piston. When second hydraulic pressure is supplied to the pressing piston in this state, the pressing piston presses the friction plate to cause a fastened state of the second friction element. The hydraulic-pressure controlling means supplies fastening hydraulic pressure to the first friction element to change the first friction element to the fastened state after supplying the second hydraulic pressure to the pressing piston if the engine is restarted by selecting operation. An automatic stop happens to the engine if there is no supply of the fastening hydraulic pressure to the first friction element and no supply of the second hydraulic pressure to the pressing piston whereas the first hydraulic pressure is supplied to the clearance adjustment piston. The selecting operation switches the automatic stop to a range in which all of the fastening hydraulic pressure, the first hydraulic pressure and the second hydraulic pressure are supplied.

According to the present invention, the automatic transmission fastens the first friction element including the return spring in the starting stage to the double acting type second friction element including the pressing piston and the clearance adjustment piston. While the engine is stopped automatically, there is no supply of the fastening hydraulic pressure to the first friction element and no supply of the second hydraulic pressure to the pressing piston of the second, friction element whereas the first hydraulic pressure is supplied to the clearance adjustment piston of the second friction element. The selecting operation switches the automatic stop of the engine to a range in which the fastening hydraulic pressure and the second hydraulic pressure are supplied, to the first friction element and the pressing piston, respectively, in order to restart the engine. When the engine is restarted, the second hydraulic pressure is supplied to the pressing piston, and then the fastening hydraulic pressure is supplied to the first friction element The second hydraulic pressure is supplied to the pressing piston staying on standby in the zero clearance position immediately after the engine restarts. Even if the generated hydraulic pressure of the mechanical oil pump is relatively low, the second friction element is set responsively to the fastened state. The fastening hydraulic pressure is then supplied to the first friction element. At this moment, the generated hydraulic pressure of the mechanical oil pump is higher than immediately after the engine restarts. Therefore, even if the return spring is provided in the first friction element, rather high hydraulic pressure is supplied to the first friction element in comparison with when the fastening hydraulic pressure is supplied to the first friction element earlier than the pressing piston. Therefore, the first friction element is set quickly to the fasted state. Consequently, there is improved responsiveness of the starting stage implementation when the engine is restarted by the range selecting operation while the engine is stopped automatically.

With regard to the present invention, it is preferable that the selecting operation switches from a non-traveling range to a forward traveling range, from the non-traveling range to a reverse traveling range, or from the forward traveling range to the reverse traveling range.

According to this configuration, the starting stage (the forward starting stage) of the D range is responsively conducted at a restart of the engine when the range is switched to perform D→P→D shift or D→N→D shift after the vehicle stops in the D range. The starting stage (the reverse starting stage) of the R range is responsively conducted at a restart of the engine when the range is switched to perform D→P→R shift, D→N→R shift or D→R shift.

With regard to the present invention, it is preferable that the control device further includes hydraulic-pressure detecting means for detecting hydraulic pressure supplied to the first friction element. The selecting operation switches from the non-traveling range to the forward traveling range. The hydraulic-pressure controlling means supplies the second hydraulic pressure to the pressing piston after supplying the fastening hydraulic pressure to the first friction element when the hydraulic-pressure detecting means detects the hydraulic pressure higher than predetermined reference hydraulic pressure.

According to this configuration, for example, relatively high hydraulic pressure is supplied to the first friction element in order to cause a quick start of the vehicle while the engine is stopped automatically in the N range. The first friction element is fastened, and then, the second friction element is fastened to conduct, the starting stage of the D range at the engine restart when the range is switched to perform D→N→D shift. Therefore, there is high controllability of fastening control with a suppressed shock.

With regard to the present invention, it is preferable that the second friction element is a brake element provided in a transmission case.

According to this configuration, the second friction element is the double acting type friction lenient which is excellent in controllability. The second friction element is the brake element which is not affected by centrifugal hydraulic pressure. Therefore, the fastening responsiveness of the second friction element is further improved.

With regard to the present invention, it is preferable that the brake element is a low reverse brake fastened in forward first speed and reverse speed.

According to this configuration, the fastening responsiveness of the low reverse brake is improved. Therefore, it is possible to remove the one-way clutch in the starting stage such as the forward first speed. The forward first speed when the vehicle starts in the D range after the engine restart is responsively conducted. The reverse speed when the vehicle starts in the R range is responsively conducted. The vehicle may quickly start.

This application is based upon Japanese Patent Application No. 2014-144083 filed on Jul. 14, 2014, the content of which is included in this application.

In order to represent the present invention, the present invention is appropriately and, sufficiently explained above through the embodiment with reference to the drawings.

However, it should be understood that those skilled in the art could easily change and/or improve the embodiment. Therefore, unless changed forms or improved form as carried out by those skilled in the art are forms in levels departing from the scope of right of claims described in the scope of claims, such changed forms or improved forms are interpreted as being included in the scope of right of claims described in the scope of claims.

INDUSTRIAL APPLICABILITY

The present invention provides n control device for an automatic transmission which fastens friction elements in a short time when an engine is restarted by range selecting operation in an automatic stop of the engine. The control device responsively conducts a starting stage of engine restart. Therefore, the present invention has industrial applicability to an automatic transmission mounted in an idling stop vehicle.

The invention claimed is:

1. A control device for an automatic transmission mounted in a vehicle including idling stop means for automatically stopping an engine when a predetermined stop condition is satisfied, and restarting the engine when a predetermined restart condition is satisfied in an engine automatically stopped state, the control device for the automatic transmission comprising:
a first friction element and a second friction element fastened in a starting stage of the automatic transmission; and
hydraulic-pressure controlling means for controlling hydraulic pressure for fastening the first and second friction elements,
wherein the first friction element includes a return spring that urges a piston of the first friction element to a release side,
wherein the second friction element includes a friction plate, a pressing piston that presses the friction plate, and a clearance adjustment piston that supports the pressing piston so as to allow relative movement of the pressing piston,
wherein the pressing piston comes into contact with the friction plate so that a clearance of the friction plate decreases to zero when first hydraulic pressure is supplied to the clearance adjustment piston to move the clearance adjustment piston,
wherein when second hydraulic pressure is supplied to the pressing piston in this state, the pressing piston presses the friction plate to cause a fastened state of the second friction element,
wherein the hydraulic-pressure controlling means supplies fastening hydraulic pressure to the first friction element to change the first friction element to the fastened state after supplying the second hydraulic pressure to the pressing piston if the engine is restarted by selecting operation,
wherein an automatic stop happens to the engine if there is no supply of the fastening hydraulic pressure to the first friction element and no supply of the second hydraulic pressure to the pressing piston whereas the first hydraulic pressure is supplied to the clearance adjustment piston, and
wherein the selecting operation switches the automatic stop to a range in which all of the fastening hydraulic pressure, the first hydraulic pressure and the second hydraulic pressure are supplied.

2. The control device for an automatic transmission according to claim 1,
wherein the selecting operation switches from a non-traveling range to a forward traveling range, from the non-traveling range to a reverse traveling range, or from the forward traveling range to the reverse traveling range.

3. The control device for an automatic transmission according to claim 2, further comprising hydraulic-pressure detecting means for detecting hydraulic pressure supplied to the first friction element,
wherein the selecting operation switches from the non-traveling range to the forward traveling range, and
wherein the hydraulic-pressure controlling means supplies the second hydraulic pressure to the pressing piston after supplying the fastening hydraulic pressure to the first friction element when the hydraulic-pressure detecting means detects the hydraulic pressure higher than predetermined reference hydraulic pressure.

4. The control device for an automatic transmission according to claim 1,
wherein the second friction element is a brake element provided in a transmission case.

5. The control device for an automatic transmission according to claim 4,
wherein the brake element is a low reverse brake fastened in forward first speed and reverse speed.

* * * * *